US006373489B1

(12) United States Patent
Lu et al.

(10) Patent No.: US 6,373,489 B1
(45) Date of Patent: Apr. 16, 2002

(54) SCALABLE VISUALIZATION FOR INTERACTIVE GEOMETRY MODELING

(75) Inventors: Hong-Qian Lu; Richard P. Hammersley, both of Austin, TX (US)

(73) Assignee: Schlumberger Technology Corporation, Austin, TX (US)

( * ) Notice: Subject to any disclaimer, the term of this patent is extended or adjusted under 35 U.S.C. 154(b) by 0 days.

(21) Appl. No.: 09/228,714

(22) Filed: Jan. 12, 1999

(51) Int. Cl.[7] ............................................. G06T 17/00
(52) U.S. Cl. ..................... 345/428; 345/420; 345/423; 345/427
(58) Field of Search ................................. 345/419, 423, 345/422, 421, 420, 424, 427, 428, 441, 442, 443, 581

(56) References Cited

U.S. PATENT DOCUMENTS

| 5,359,526 A | | 10/1994 | Whittington et al. | |
| 5,497,452 A | | 3/1996 | Shimizu et al. | |
| 5,929,860 A | * | 7/1999 | Hoppe | 345/419 |
| 6,108,006 A | * | 8/2000 | Hoppe | 345/423 |

FOREIGN PATENT DOCUMENTS

| EP | 0 447 629 A2 | 9/1991 |
| EP | 0 784 295 A2 | 7/1997 |
| EP | 0 805 418 A2 | 11/1997 |
| WO | WO 95/30209 A | 11/1995 |
| WO | WO 98/27498 A | 6/1998 |

OTHER PUBLICATIONS

Assa, S. et al, "Feature–Based Geometric Modeling for Geoscience", GOCAD ENSG Conference, 3D Modeling of Natural Objects: A Challenge for the 2000's, Jun. 4 & 5, 1998.

Cho, W. et al, "Topologically reliable approximation of composite Bezier Curves", Computer Aided Geometric Design, vol. 13, 1996, pp. 497–520.

De Floriani, L. et al, "Hierarchical Triangulation for Multiresolution Surface Decription", ACM Transactions on Graphics, vol. 14, No. 4, Oct. 1995, pp. 363–411.

(List continued on next page.)

*Primary Examiner*—Mark Zimmerman
*Assistant Examiner*—Kimbinh T. Nguyen
(74) *Attorney, Agent, or Firm*—Pehr B. Jansson; Howard L. Speight

(57) ABSTRACT

A method, computer system and article of manufacture for visualizing a model including a first surface is disclosed. The method includes determining, as the model is being built, the rendering resolution of a portion of the first surface based on a view frustum from which the first surface is to be viewed and rendering the portion of the first surface on the output device using the rendering resolution. The vertices and edges to be rendered are selected based on the view frustum, using view frustum culling and bounding sphere projection. The vertices and edges selected to be rendered are tessellated using incremental and decremental tessellation. The tessellated vertices and edges are rendered. Predictive techniques are used to estimate future view frustums. Quality may be traded off against performance by adjusting parameters. Material properties are represented. The method, computer system and article of manufacture allow adaptively visualizing geological data in a geoscience model by modifying the visualization of a geometry object according to a view frustum from which the geometry object is to be viewed.

55 Claims, 28 Drawing Sheets

OTHER PUBLICATIONS

DeRose, T. et al., "Subdivision Surfaces in Character Animation", SIGGRAPH'98, Pixar Animation Studios, 1998.

Eck M. et al, "Multiresolution Analysis of Arbitrary Meshes", Proceedings of SIGGRAPH'95, 1995, pp. 173–182.

Garland M. et al, "Surface Simplification Using Quadric Error Metrics", Proceedings of SIGGRAPH'97, 1997.

Gumhold S. et al, "Real Time Compression of Triangle Mesh Connectivity", SIGGRAPH'98, 1998.

Gumhold S. et al. "Compression of Discrete Multiresolution Models", URL: http://www.gris.uni-tuebingen.de/~sgumhold, 1998.

Heller, M. "Triangulation Algorithms For Adaptive Terrain Modeling", Proceedings of 4th International Symposium on Spatial Data Handling, 1990, pp. 163–173.

Herzen B. et al, "Accurate Triangulations of Deformed, Intersecting Surfaces", Computer Graphics, vol. 21, No. 4, Jul. 1987, pp. 103–110.

Hoppe, Hugues, "Progressive Meshes", SIGGRAPH'96, 1996.

Ing D., "Spatial Modeling by Delaunay Networks of Two and Three Dimensions", http://www.iko.unit.no/tmp/term/term.html, Feb. 1993.

Kobbelt L., et al, "Interactive Multi-Resolution Modeling on Arbitrary Meshes", Proceedings of SIGGRAPH'98, 1998.

Lu K., "Common Model Builder—A Toolkit for Multidisciplinary Geoscience Modeling Applications", GOCAD ENSG Conference, 3D Modeling of Natural Objects: A Challenge for the 2000's, Jun. 4 & 5,1998.

Pajarola R. et al, "Large Scale Terrain Visualization Using The Restricted Quadtree Triangulation", Visualization 1998, pp. 1–9.

Shewchuk J., Triangle: Engineering a 2D Quality Mesh Generator and Delaunay Triangulatior, http://www.cs.smu.edu/afs/cs/project/quake/public/www/triangle.html, date unknown.

Welch G. et al, "An Introduction to the Kalman Filter", http://www.cs.unc.edu./~welch/kalman/kalman.html, date unknown.

Real Time Graphics for Visual Simulation: Advanced Techniques from the Top Down, SIGGRAPH 1998 Course Notes, 1998.

Wang, S. et al: "Shape Simpification of Free–Form Surface Objects for Multi–Scale Representation", IEEE International Conference on Systems, Man and Cybernetics, US, New York, IEEE, 1996, pp. 1623–1628.

Jones, C.B., "Data structures for three–dimensional spatial information systems in geology", International Journal of Geographical Information Systems, GB, London, vol. 3,Nno. 1, Jan. 1, 1989, pp. 15–31.

Cohen, J. et al., "Simplification Envelopes", Computer Graphics Proceedings (SIGGRAPH), US, New York, NY, ACM, 1996, pp. 119–128.

Arata, L.K., "Simplification of Triangle Meshes for Fast Surface Rendering of Tomographic Data", Nuclear Science Symposium and Medical Imaging Conference, US, New York, IEEE, 1994, vol. 13, pp. 1438–1442.

Cignoni, P. et al., "Multiresolution Representation and Visualization of Volume Data", IEEE Transactions on Visualization and Computer Graphics, US, IEEE Service Center, Piscataway, NJ, vol. 3, No. 4, Oct. 1, 1997, pp. 352–369.

Meyer, F.G. et al., "Tracking Myocardial Deformation Using Phase Contrast MR Velocity Fields: A Stochastic Approach", IEEE Transactions on Medical Imaging, US, IEEE Inc., New York, vol. 15, No. 4, Aug. 1, 1996 pp. 453–465.

T. Bode et al., "First Experiences with Geostore, An Information System for Geologically Defined Geometries", Lecture Notes in *Computer Science*, Feb. 1, 1994, p. 35–44, XP002064462 and p. 36, line 2.1–p. 41, line 3.4.

* cited by examiner

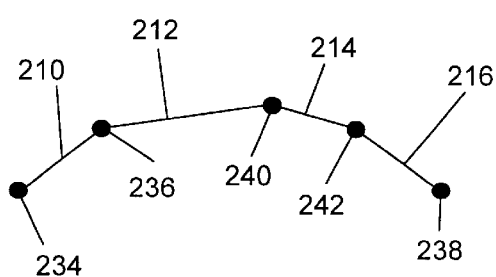
Fig. 29a
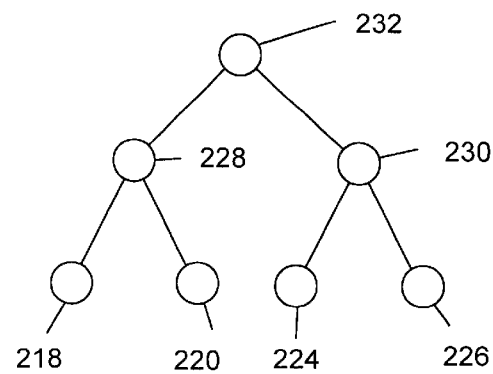
Fig. 29b
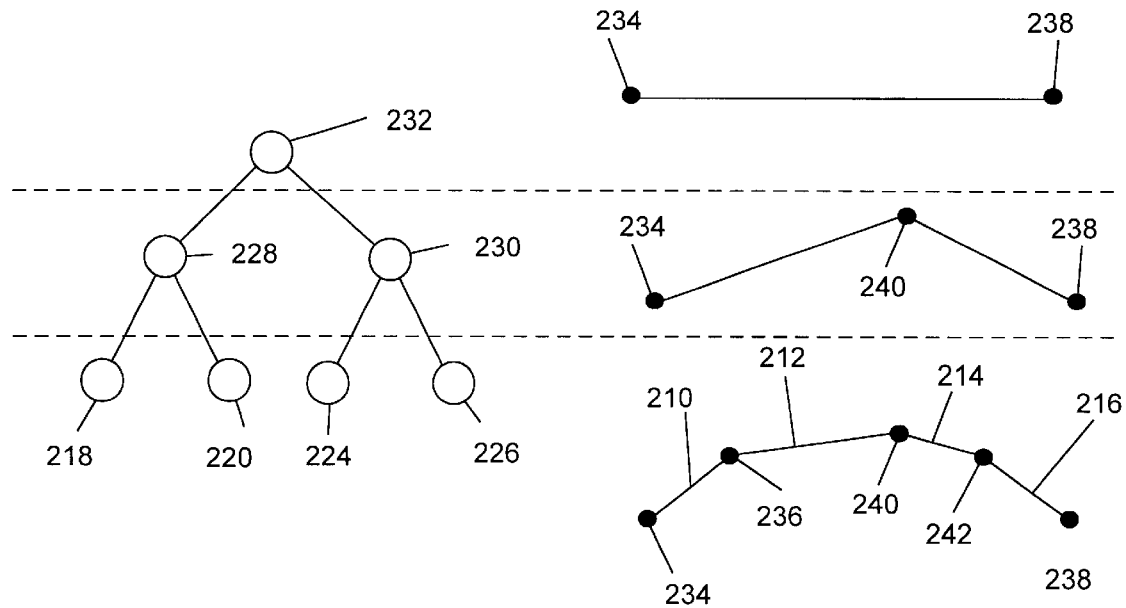
Fig. 29c
Fig. 29d

SCALABLE VISUALIZATION FOR INTERACTIVE GEOMETRY MODELING

FIELD OF THE INVENTION

This application relates generally to the fields of interactive three dimensional computer graphics and geometry modeling. More particularly, this invention relates to scalable visualization for interactive geometry modeling. Even more particularly, this invention relates to scalable visualization for interactive geometry modeling in geoscience.

BACKGROUND OF THE INVENTION

Geologists, geophysicists and petroleum engineers use models, including computerized models, of the earth's crust to plan exploration and production of hydrocarbons and, to a lesser extent, other minerals. As hydrocarbons become more scarce, the accuracy of the computerized models becomes increasingly important to limiting the cost of locating and producing hydrocarbons and the associated cost of hydrocarbon products, such as gasoline and heating oil.

Interactivity is essential to geoscience modeling and visualization applications. Interactive applications must react quickly to user commands, allowing the user to easily control how a model is built and visualized. However, as models grow larger, applications typically become slower. At some point, response time exceeds interactive criteria. Although using a faster processor and graphics hardware might recoup lost interactivity, users can quickly create models requiring more computing power than available.

Adaptive visualization has been an area of significant research in recent years in the visualization community concerned with large model visualizations. Recently, adaptive visualization has appeared in some products such as, for example, the Active Surface Definition feature in IRIS Performer 2.2 from Silicon Graphics® Inc. In these works existing geometry models are visualized, as shown in FIG. 1. Typically, the data 2 is used to create a surface representation for geometry modeling 4, such as NURBS. The geometry model 6 is constructed from the surface representation for geometry modeling. To interactively visualize a large model, the surface representation of the model 4 is converted to the representation of the selected graphics package 8, which is then visualized 10. For interactive geometry modeling, this approach not only takes more memory space, but also takes time to reconstruct the adaptive visualization representation if the underlying geometry model has been changed.

SUMMARY OF THE INVENTION

In general, in one aspect, the invention features a method for visualizing a model comprising a first surface. The method is implemented in a programmed computer comprising a processor, a data storage system, at least one input device and at least one output device. The method and the model are stored on a computer-readable media. The method comprises determining, as the model is being built, the rendering resolution of a portion of the first surface based on a view frustum from which the first surface is to be viewed and rendering the portion of the first surface on the output device using the rendering resolution.

Implementations of the invention may include one or more of the following. The first surface may comprise one or more vertices and one or more edges. Determining may comprise selecting, based on the view frustum, the vertices to be rendered from among the one or more vertices and the edges to be rendered from among the one or more edges. The vertices to be rendered and the edges to be rendered may be tessellated. The method may further comprise partitioning the surface into $n_i$ nodes at resolution level-i using a level-i set of boundaries; partitioning the surface into $n_{i+1}$ nodes at resolution level-i+1 using a level-i+1 set of boundaries, resolution level-i+1 having greater resolution than resolution level-i. The method may further comprise associating each level-i+1 node with a unique level-i node; associating with each level-i node the level-i+1 nodes associated to the node; and each node having associated with it a bounding object, each bounding object spatially bounding its associated node.

Selecting the vertices to be rendered may comprise selecting a node front from among the nodes and collecting the vertices from the node front. Selecting the node front may comprise culling the nodes that are outside a view frustum, the view frustum being determined by the view frustum from which the surface is to be viewed. Selecting the node front may comprise selecting nodes from among those nodes having bounding objects that intersect the view frustum. Selecting may comprise projecting a level-i node to a screen. The projection of the level-i node to the screen may have an area. Selecting may further comprise adding the level-i node to the node front if the area of the projection is smaller than a predefined minimum resolution; adding the level-i node to the node front if there are no level-i+1 nodes associated with the level-i node; and considering the level-i+1 nodes associated with the level-i node for inclusion in the node front if the area of the projection of the level-i node is larger than a predefined minimum resolution.

The bounding object of a level-i node may be a sphere. The level-i node may be added to the node front if the following equation is satisfied:

$$R(\text{sphere}) \leq K \times D$$

wherein

K is a constant computed for the view frustum; and

D is the distance from the center of the level-i node's bounding object to a view point associated with the view frustum.

The projection may be onto a projection plane, the projection plane having a minimum side length, and the projection being viewed from the view point through a viewport, the viewport having a side length corresponding to the minimum side length of the projection region, wherein $$K = \frac{L \times R_{min}(\text{screen})}{d}$$

wherein

L is the ratio of the minimum side length of the projection region on the projection plane to the corresponding side length of the viewport;

$R_{min}$(screen) is the predetermined radius of minimum projection area on the screen; and d is the distance from the view point to the projection plane.

The level-i node may comprise one or more simplices, each simplex comprising a surface normal, wherein the bounding object of a level-i node is a sphere;

the level-i node is added to the node front if the following equation is satisfied:

$$R(\text{sphere}) \leq f(\theta, \Delta\theta) \times K \times D$$

where f(θ,Δθ) is a scaling function of the average normal θ and the deviation Δθ of the surface normals of the level-i node's simplices K is a constant computed for the view frustum; and D is the distance from the center of the level-i node's bounding object to a viewpoint associated with the view frustum.

f(θ,Δθ) may be precomputed and stored in a lookup table.

The method may further comprise removing no-longer-to-be-rendered vertices from the list of vertices to be rendered and adding vertices to the list of vertices to be rendered when the view frustum is changed. Removing the tessellation from a no-longer-to-be-rendered portion of the surface including the no-longer-to-be-rendered vertices may be accomplished using decremental tessellation. Tessellating an added portion of the surface including the added vertices may be accomplished using incremental tessellation.

The surface may comprise one or more cells and a 2D map, the 2D map comprising all of the vertices in the surface, the 2D map having a domain and a range. Tessellating may comprise tessellating a subset of the vertices in the domain of the 2D map; and creating a triangle mesh using the range values of the subset of vertices and the tessellation of the domain. Tessellation of the subset of vertices in the domain of the 2D map may include a chosen collection of edges.

The surface may comprise one or more 2-cells, one or more 1-cells that form the boundaries of the 2-cells, and one or more 0-cells that form the boundaries of the 1-cells. Rendering may comprise decimating the 1-cells; identifying the decimated 1-cells that form the boundary of a 2-cell; detecting an intersection between the 1-cells that form the boundary of the 2-cell; and removing the intersection. Each 1-cell may comprise one or more simplices. Decimating a 1-cell may comprise building a tree for the 1-cell by assigning each simplex of the 1-cell to a unique leaf node of the tree; and associating n connected level-i+1 nodes with a level-i node; defining as critical vertices at resolution level-i the boundary vertices of the level-i nodes; and selecting a node front of the tree; collecting the vertices from the node front; adding the 0-cells to the collection of vertices; and building a collection of edges from the vertices in a domain of a 2D map.

The view frustum may be related to a camera position. The camera position may have a history and an actual future time position at a future time. The method may further comprise predicting, prior to the future time, the camera position at the future time based on the camera position history; computing, prior to the future time, the future time portion of the first surface to be rendered at the future time; determining, prior to the future time, the future time rendering resolution of the future time portion based on a view frustum from which the first surface is to be viewed at the future time; and rendering on the output device, when the future time arrives, the future time portion of the first surface using the future time rendering resolution if the predicted future time camera position substantially matches the actual future time camera position. Predicting may be accomplished with a Kalman filter.

The method may have one or more performance criteria and one or more quality criteria. A user may be allowed to adjust one or more parameters, wherein adjusting at least one of the one or more parameters results in a tradeoff between at least one performance criterion and at least one quality criterion.

The method may further comprise rendering on the output device, using the rendering resolution, a representation of a material property associated with the rendered portion of the first surface.

In general, in another aspect, the invention features a method for visualizing a model comprising one or more surfaces. The method comprises building a multi-resolution representation of one of the one or more surfaces; generating a graphics model based on the multi-resolution surface representation; and rendering the graphics model of the surface representation.

Implementations of the invention may include one or more of the following. The method may further comprise generating a geometry model based on the multi-resolution surface representation; incorporating the geometry model and the multi-resolution surface representation into a graphics model; and rendering the graphics model.

In general, in another aspect, the invention features a method for visualizing geological data representing a geoscience model of the characteristics of a geological region, the geoscience model comprising one or more geometry objects. The method comprises adaptively visualizing the geological data in the geoscience model by modifying the visualization of a geometry object according to a view frustum from which the geometry object is to be viewed.

BRIEF DESCRIPTION OF THE DRAWING

FIGS. 29a, 29b, 29c and 29d illustrate decimation of a 1-cell using a binary tree.

DESCRIPTION OF THE PREFERRED EMBODIMENTS

Figure 1:
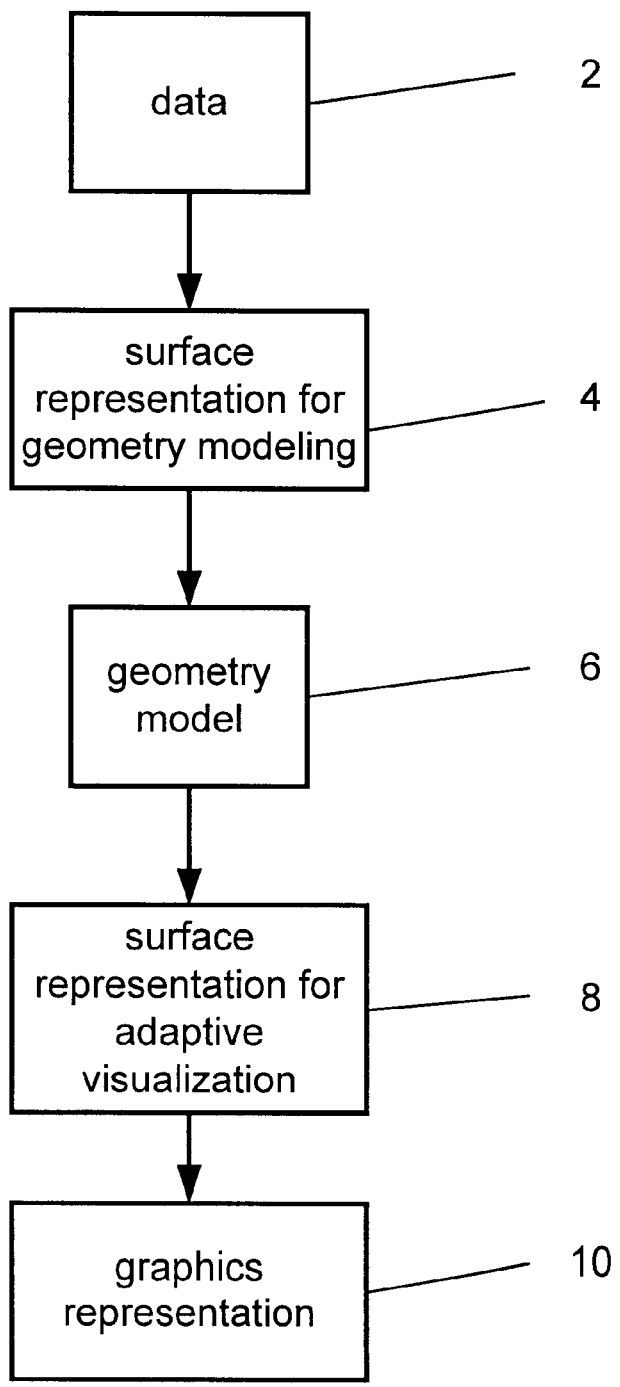
FIG. 1 is a block diagram of a prior art geometry modeling visualization system.

Two of the major issues for interactive geometry modeling of large models are memory usage and rendering performance. With the currently available commercial geometry modeling technology, the whole model has to reside in the main memory. To support a wide range of geoscience applications, the geometry modeling engine and graphics engine are two separate software packages from different vendors. Both engines represent the geometry model in their own ways, which takes even more memory. There are millions of triangles present in a large model. The existing graphics hardware of a mid range workstation or personal computer cannot render such models interactively. For example, in a typical seismic resolution model comprising 25 surfaces of 1000×1000 grids each, there are 50 million triangles. A mid-range workstation, as of year 1998, can draw about 0.5 million triangles per second. It takes about 100 seconds to draw the scene. Therefore, to render at least 10 frames per second (a commonly-cited lower bound for interactive visualization), the graphics hardware needs to be at least 1000 times faster.

SIGMA, a Scalable Interactive Geometry Modeling Architecture, described in copending U.S. patent application Ser. No. 09/163,075, entitled MODELING AT MORE THAN ONE LEVEL OF RESOLUTION, incorporated by reference, solves some of these problems. SIGMA provides a multiresolution surface representation. With this representation, SIGMA supports efficient geometry computations for building geometry models, provides adaptive decimation of models without cracking, and enables partial loading of the model from a persistent storage.

The invention, a system for scalable visualization for interactive geometry modeling, addresses the visualization aspect of SIGMA that allows visualization of large models. SIGMA's surface representation and its decimation and partial loading algorithms are used in adaptive visualization for interactive geometry modeling. To achieve the required performance, the model being visualized is dynamically decimated according to the camera position with varying resolution across the model. An efficient projection method facilitates such dynamic behavior. The same representation of the model is used for both geometry model building and visualization. The visualization algorithms applies to both coherent models (as discussed below) and non-coherent models. The material properties of a model are also visualized.

Implementations of the system may provide one or more of the following features:

1. Adaptive visualization techniques may be applied to interactive geometry modeling. The geometry model may be built from scratch or may go through major structural changes. The adaptive visualization applies during the model construction and to an existing model.
2. The surface representation may be used for visualization and geometry computation.
3. Both the geometry representation and visualization may be incrementally updated, rather than reconstructed, when the model changes.
4. The visualization technique may apply to coherent geometry models and non-coherent geometry models that have inconsistent micro and macro topologies (to be explained later.)
5. The adaptive visualization technique may be applied to a geoscience modeling domain that has large, high resolution non-manifold geometry models.

Figure 2:
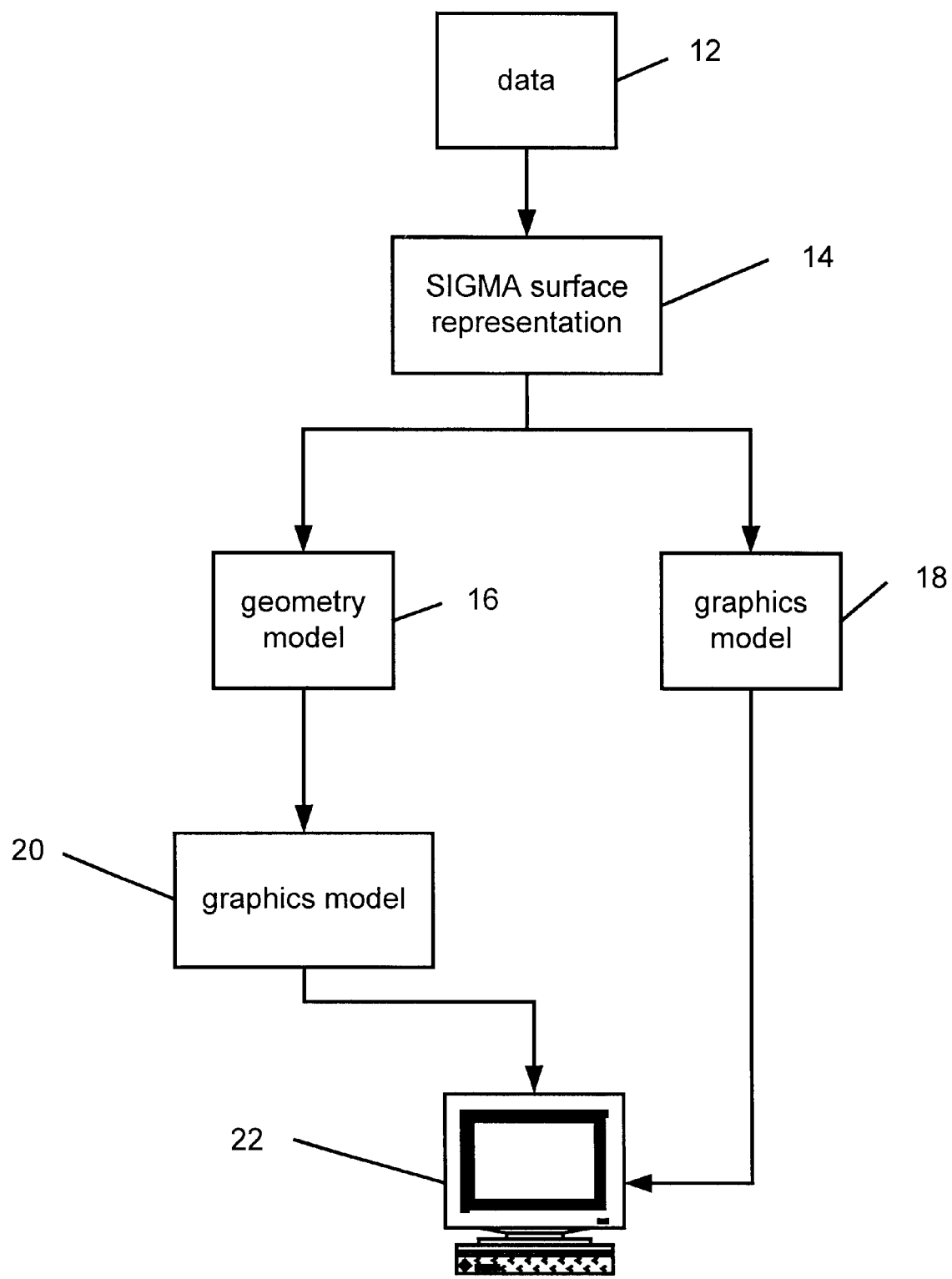
FIG. 2 is a block diagram of a system for scalable visualization for interactive geometry modeling according to the present invention.

The system is illustrated in FIG. 2. The data 12 is used to build the SIGMA surface representation 14, which is used to build both a geometry model 16 and a graphics model 18. The geometry model 16 and the underlying SIGMA surface representation are used to generate the graphics model of the geometry model 20. The graphics models 18 and 20 are rendered on a display device 22.

While the following discussion focuses on the application of the system to geoscience modeling, it will be understood that the system described herein can be applied to any geometry model. For example, medical imaging would benefit from the application of the techniques described herein.

To explore hydrocarbons, various log data and seismic survey are interpreted to produce models that describe the structure and properties of rocks and fluid and gas contents in the subsurface. To facilitate rapid, accurate decision making, activities or applications for the exploration from different disciplines should be centered around a common model. Such a model is called a Shared Earth Model (SEM). Geometry models that describe the three dimensional (3D) structure of the subsurface and properties within are key ingredients of the Shared Earth Model.

GEOMETRY MODELING

The 3D geometry modeling application framework developed by the assignee of this application, Common Model Builder, uses a geometry engine called the Geometry Query Interface (GQI), described in U.S. patent application Ser. No. 08/772,082, entitled MODELING GEOLOGICAL STRUCTURES AND PROPERTIES, incorporated by reference. GQI is built on a commercial geometry kernel, SHAPES®, from XOX Corporation®. In addition, the GQI provides feature-based modeling and a material property framework for geometry modeling in geoscience. The geometry model contains geometry, topology, and material property distributions. The GQI further distinguishes macro-topology and micro-topology.

Geometry

Geometry is the point-set representation of geometry model components, such as points, curves, and surfaces. In other words, geometry represents the shapes of these components. In a geometry model of the subsurface, surfaces represent the discontinuities of the material properties of the earth. The geometry considered here is piecewise linear, that is, curves are polylines and surfaces are triangle meshes. In such geometry, a point is called a 0-simplex, a line segment is called a 1-simplex, and a filled triangle in 3D space is called a 2-simplex. Precise definitions of simplices can be found in copending U.S. patent application Ser. No. 09/163,075, entitled MODELING AT MORE THAN ONE LEVEL OF RESOLUTION.

Geometry objects in SHAPES® are modeled as regions on curves, surfaces, or in space. This curve, surface, or space that defines the underlying extent for an object is modeled as the image of a parametric function—called a "map". A map is a continuous function from a domain space to a range space. The range space has to be the same for all curves and surfaces and is typically three-dimensional Euclidean space. The domain space for a surface is typically a rectangle in the plane and as classification (discussed below) proceeds, the domain is restricted to subsets of the rectangle.

Macro-Topology

Figure 3:
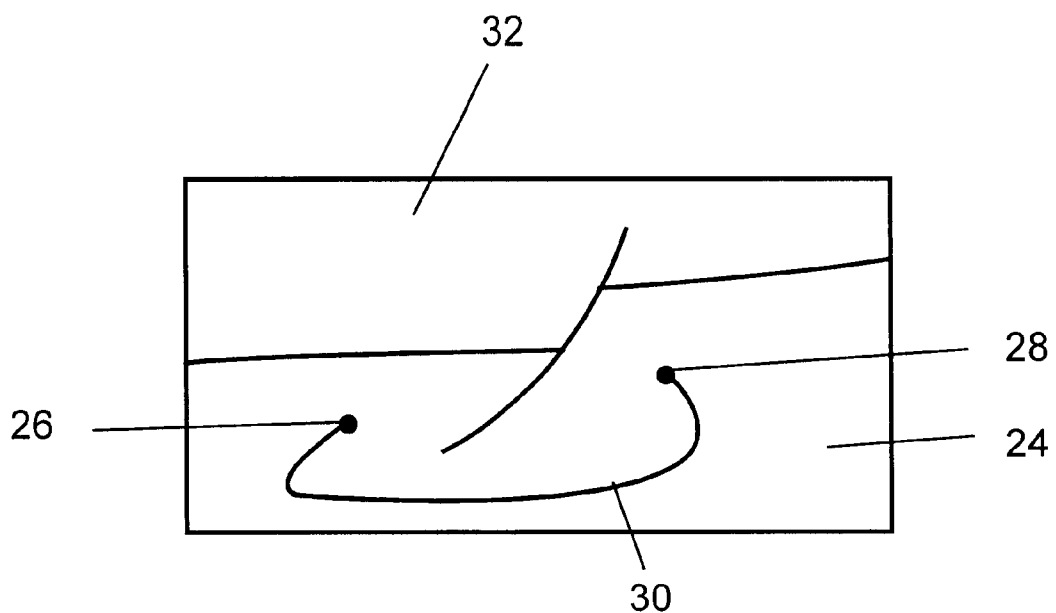
FIG. 3 is an illustration of a cell.
Figure 4:
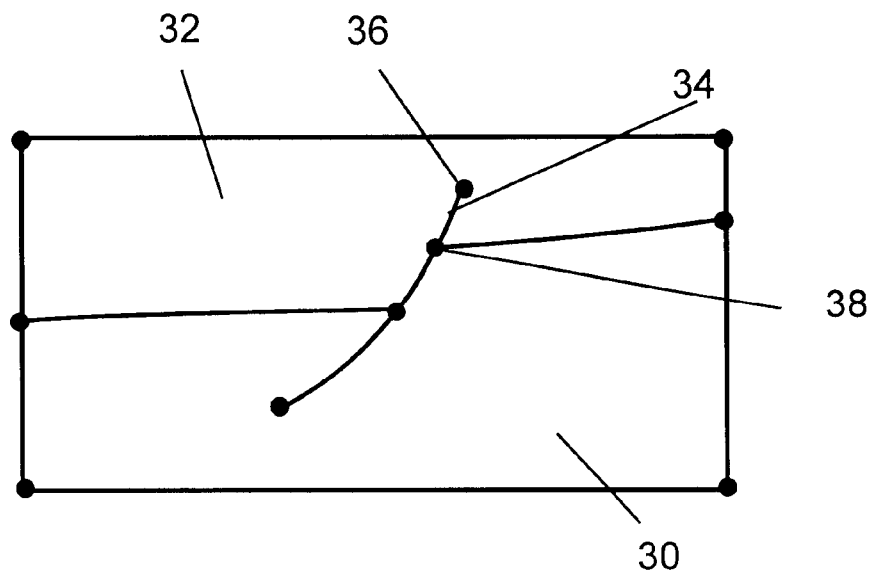
FIG. 4 is an illustration of cells having different dimensions.

Macro-topology describes the relationship between topological components of a geometry model. The macro-topology is represented by "cells" that are the basic building blocks for the geometry model using SHAPES®. A cell is a path-connected subset of Euclidean space of a fixed dimension. Path-connected means any two points in the cell can be connected by a path in the cell, as illustrated in FIG. 3. Area 24 is a cell because any two points, such as points 26 and 28, can be connected by a path, such as path 30. Similarly, area 32 is a cell. The dimension refers to the dimension of the geometry of the cell, a 0-cell is a point, a 1-cell is curve, a 2-cell is a surface and a 3-cell is a volume. In FIG. 4 areas 30 and 32 are distinct cells, as are the line segments, e.g. 34, between intersection points, e.g. 36 and 38, as are the intersection points, e.g. 36 and 38, themselves. The cells represent connected regions on maps that are bounded by lower-dimensional cells.

Macro-Topological Identification

For the purposes of the surface representation it is necessary to know which vertices lie on the boundary of a surface. This information is maintained by the SHAPES® geometry engine and SHAPES® permits efficient queries identifying whether a vertex is identified to a 1-cell vertex or a 0-cell vertex. This is equivalent to identifying whether the vertex is on the boundary of the surface.

Classification

Given two cells, A and B, "classification" subdivides the respective point sets of the two cells into an inside part, an outside part, and a part on the boundary of the other. Geometry model building is a process of classifications of geometry objects represented by sets of connected cells. For building earth models, one starts with surfaces, such as horizons and faults. These surfaces are classified with a "volume of interest". Effectively, the surfaces subdivide the volume of interest into "sub-volumes". This process is called "Irregular Space Partitioning" (ISP), and resulting models are called ISP models. For example, in FIG. 5 a fault 40 is classified with an earth model 42 at the location indicated by a dotted line 44. Prior to the classification, the earth model comprises a volume 46 and two horizons 48 and 50. The classification splits cells that are sub-divided by lower-dimensional cells. Thus, in FIG. 6, the fault 40 is split into segments 52, 54 and 56 by the intersections of horizon 48 and fault 44, and horizon 50 and fault 44. Similarly, the combination of horizons 48 and 50 and fault 40 splits volume 46 into two subvolumes, 58 and 60.

Feature-Based Modeling

While SHAPES® can represent geometries of arbitrary complexity, it is hard for an application to keep track of the cells and material property assignments to the cells as cells are added, split, merged, and deleted as side effects of geometric operations. GQI extends SHAPES® technology with the concept of "features", which is called "feature-based modeling", described in U.S. patent application Ser. No. 08/772,082, entitled MODELING GEOLOGICAL STRUCTURES AND PROPERTIES.

Figure 5:
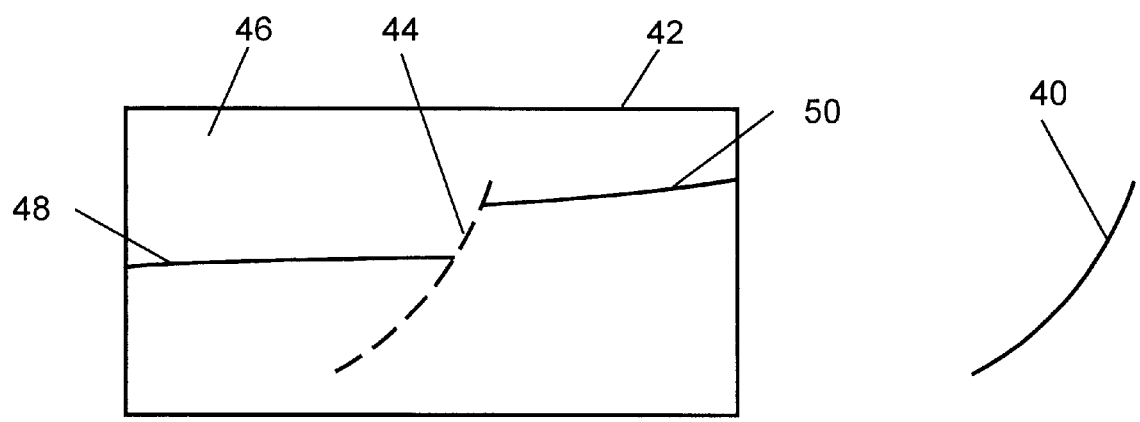
FIG. 5 is an illustration of classification.
Figure 6:
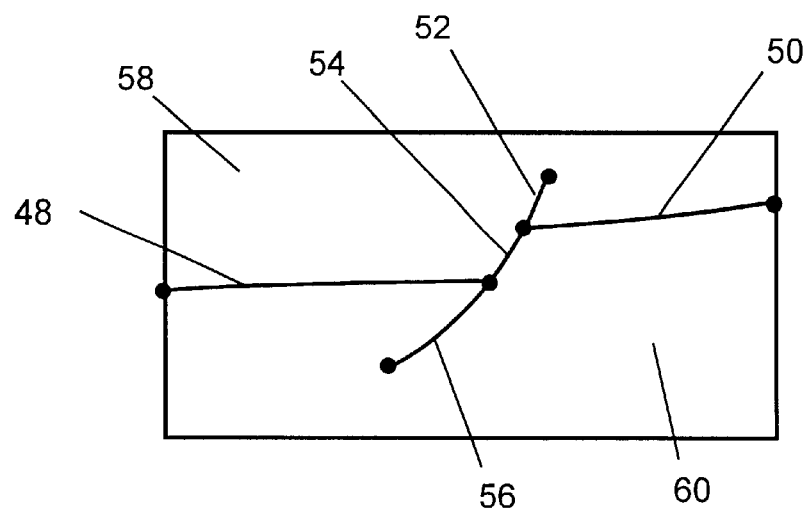
FIG. 6 is an illustration of cells being split by classification.

Features are the business objects of geometry modeling. A feature is a group of one or more cells. A feature can also contain other features. Features serve two main purposes. First, features represent objects that are of interest to the application domain so that applications interface with features instead of cells that constitute the features. Secondly, features are persistent, that is, features maintain the link between an application database and the geometry model database. In addition, features have the following conceptual properties:

Features preserve their point set. For example, when the fault 40 in FIG. 5 is defined as a feature, fault 40 continues to represent the entire fault although the fault is split into three cells, as shown in FIG. 6.

Features may overlap in space and may be discontinuous.

Features can carry properties that are inherited by their components.

GQI manages features and material property assignments and evaluations within features. Applications build sub-surface models by inserting surface features, such as horizons and faults, into the volume of interest. The resulting sub-volumes are organized into features that are meaningful to geoscience applications. Material properties can be assigned to any of the features in the model.

SIGMA

As mentioned above, the Scalable Interactive Geometry Modeling Architecture (SIGMA) has been developed to address issues when building large high resolution geometry models. The detailed description of SIGMA can be found in U.S. patent application Ser. No. 09/163,075, entitled MODELING AT MORE THAN ONE LEVEL OF RESOLUTION. The following discussion briefly reviews the SIGMA surface representation.

An Hierarchical Surface Representation

The surface representation is a multiresolution hierarchy based on a regular subdivision. The hierarchy is implemented as a quadtree and is preferably built for a structured grid. To provide topological flexibility the surface is a hybrid grid-mesh. A grid representation is used where possible. Where greater flexibility is required, for example to support irregular intersection curves, a triangle mesh is used.

A quadtree is a tree data structure with nodes that have four children, except the leaf nodes that have no children. Every node in the quadtree has a unique depth and position in the tree, hence every node can be assigned a unique key.

Building the Tree

Figure 7:
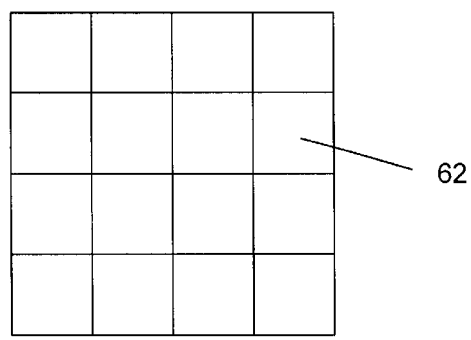
FIG. 7 is an illustration of a grid.
Figure 8:
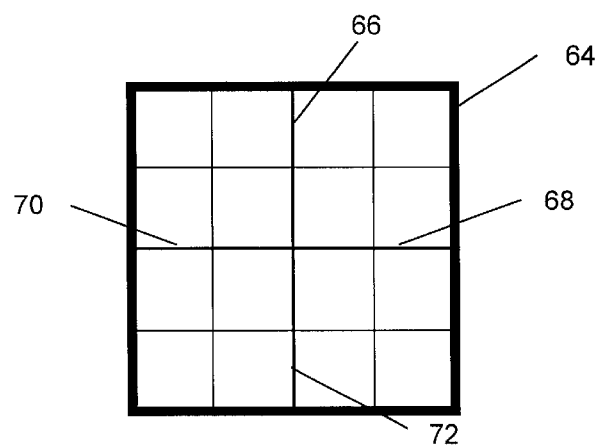
FIG. 8 is an illustration of a quadtree.
Figure 9:
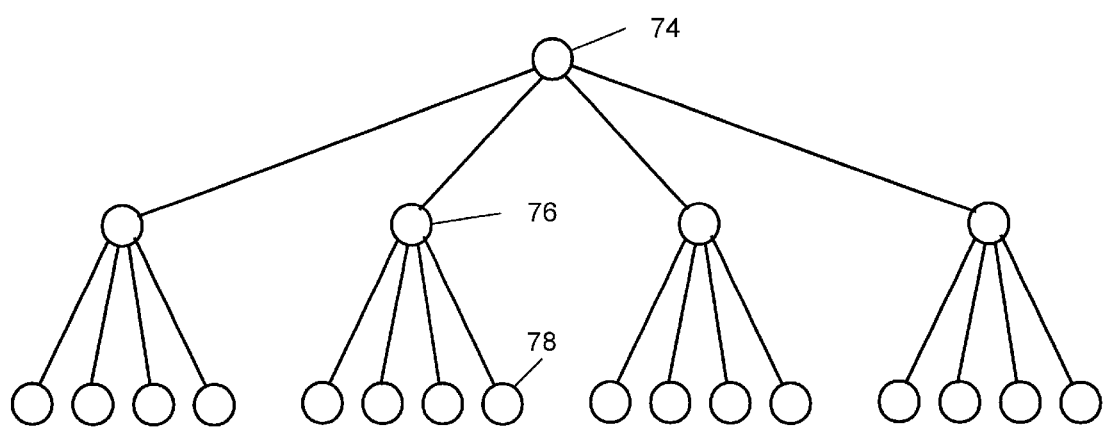
FIG. 9 is an illustration of a graphical representation of a quadtree.

Given a surface, simplices are assigned to a unique quadtree leaf node. Each quadtree node, except the leaf nodes, is assigned the simplices of its descendants. For a structured grid, a regular subdivision can be applied to the parameter space of the grid. Each grid cell is naturally assigned to a unique quadtree leaf node. A grid cell when triangulated contains a pair of simplices, these simplices are assigned to the quadtree leaf node of their grid cell. FIG. 7 shows a grid in its parameter space with 16 grid cells, e.g. 62. A quadtree is built by a regular subdivision of the grid. The root node (which is the only node at tree level "0") represents all the grid cells and has a boundary 64 which encompasses all of the grid cells, as shown in FIG. 8 (boundary 64 is shown as heavy black lines in FIG. 8). Each of the four nodes at level 1, the next level of resolution, represent four grid cells (the boundaries of the nodes at level 1 are represented by lines 66, 68, 70 and 72 and corresponding portions of boundary 64). Each leaf node has one grid cell (each of the lines in FIG. 8 is a boundary of at least one leaf node). A graphical representation of a quadtree is illustrated in FIG. 9, in which there is one root node 74, four level 1 nodes, e.g. 76, and sixteen level 2 nodes (also leaf nodes), e.g. 78.

Critical Vertices

Figure 10:
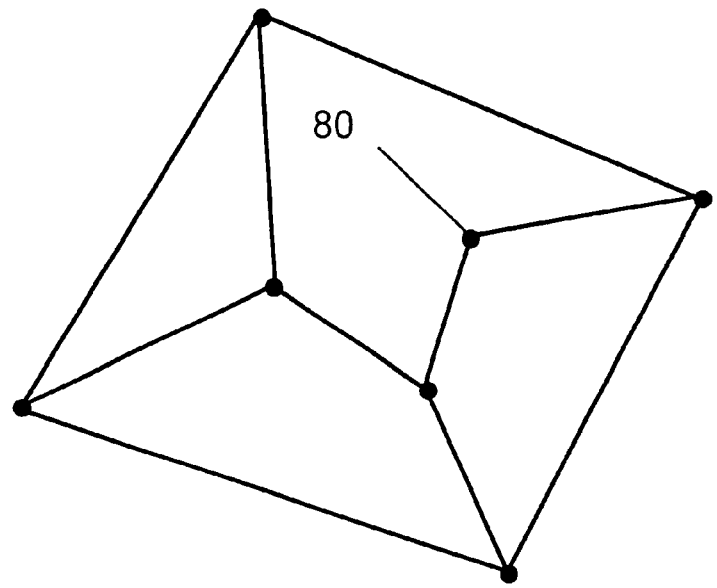
FIG. 10 is an illustration showing a vertex being dropped from a graph without changing the topology of the graph.
Figure 10:
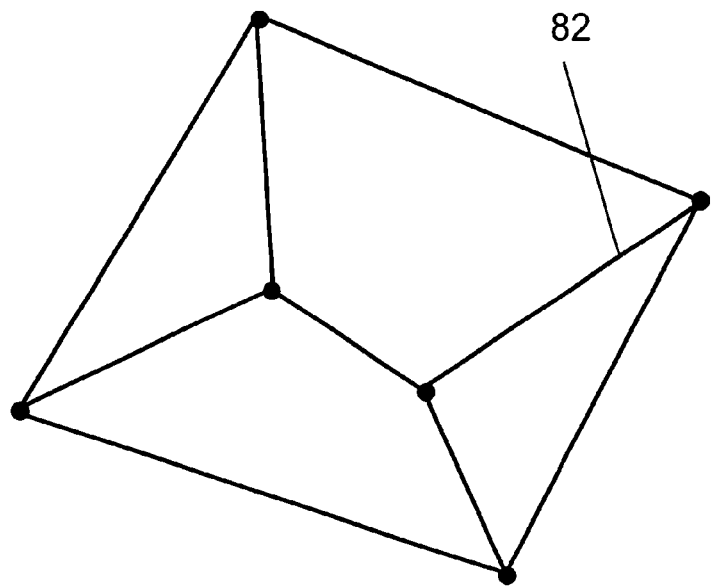

Each quadtree node comprises a collection of simplices and has a well-defined boundary. This boundary comes from the full-resolution simplices. It is possible to simplify the boundary without destroying its topology. For example, FIG. 10 shows that a vertex 80 can be dropped and the edge that it defines 82 can be straightened without changing the basic structure of the graph. (More precisely the topology of the graph has not changed.)

In particular, vertices of valence two can be removed without changing the topology of the graph. It follows there is a collection of vertices that cannot be removed without changing the topology of the graph. These vertices are of interest as they encode the topology of the surface. However, computing this collection of vertices can be difficult. SIGMA defines a collection of vertices, called the "critical vertices", that include the vertices described above and are computationally cheap to find.

A vertex is a critical vertex at depth i if it is identified with a 0-cell, or identified with a 1-cell vertex and lies at the boundary of two or more quadtree nodes at depth i, or in the interior of the surface and at the intersection of three or more quadtree nodes at depth i.

Figure 11:
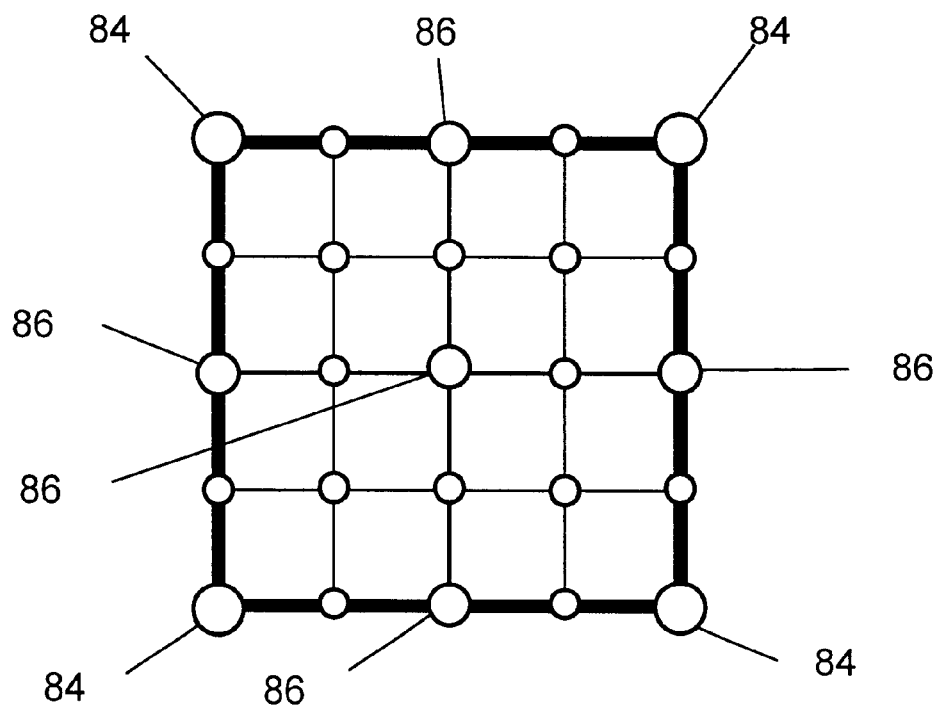
FIG. 11 is an illustration of critical vertices.

From the definition, if a vertex is critical at depth d, then the vertex is critical at all depths. Critical vertices can be identified efficiently using quadtree keys. The details of the algorithm are described in U.S. patent application Ser. No. 09/163,075, entitled MODELING AT MORE THAN ONE LEVEL OF RESOLUTION. FIG. 11 shows an example of critical vertices. At resolution level 0, only vertices 84 (represented by large circles) are critical. At resolution level 1, vertices 86 (represented by medium circles) are critical and vertices 84 are still critical. At resolution level 2, all of the remaining vertices (represented by small circles) are critical and vertices 84 and 86 are still critical.

Decimation

Models are often built which are very much larger than can be rendered using current hardware. Decimation is a process which sub-samples the model to create a reduced, but accurate representation of the full model. A collection of nodes, C, of the tree T is a "node front" if every leaf node of T has at most one ancestor in C (a node is an ancestor of itself). A node front is a "complete node front" if every leaf node of T has exactly one ancestor in C.

The critical vertices from the nodes in a complete node front describe a decimated view of the surface. By identifying a common collection of vertices on the boundary of the surface that are shared by other surfaces in the model it is ensured that cracking of the model does not occur. If the surfaces are parameterized, a decimated view of the surface can be built by calling a constrained Delaunay tessellator, which guarantees the edges around the boundary are present in the triangulation.

INTERACTIVE GEOMETRY MODELING

To support geometry modeling and visualization of a large variety of geoscience data, Common Model Builder uses GQI/SHAPES for geometry modeling and a general purpose graphics engine, currently OPEN INVENTOR, for visualization. When designing an application including both a graphics and a geometry system, the main design issues are how to render and visually interact with the geometry model; and how to make the geometry engine and the graphics engine work together smoothly.

An Interactive Geometry Modeling (IGM) library, described in copending U.S. patent application Ser. No. 09/021,220, entitled INTERACTIVELY CONSTRUCTING, EDITING, RENDERING AND MANIPULATING GEOSCIENCE MODELS, incorporated by reference, integrates GQI with OPEN INVENTOR providing a unified interface for constructing, rendering, editing and manipulating 3D models. The integration has to solve three major issues:

The representation of shape of geometric and graphic objects is different.

The representation of geometric and graphic object attributes is different.

Geometry computations are much slower than graphical computations.

Both geometry and graphics engines are self-contained and manage their own objects and operations on them. They use different internal representations for equivalent objects to describe their geometry, topological relationships, and physical properties. This leads to inconsistencies when the same object is operated on by both engines; integration has to keep track of and reconcile those inconsistencies.

Geometry and Graphics Integration

Figure 12:
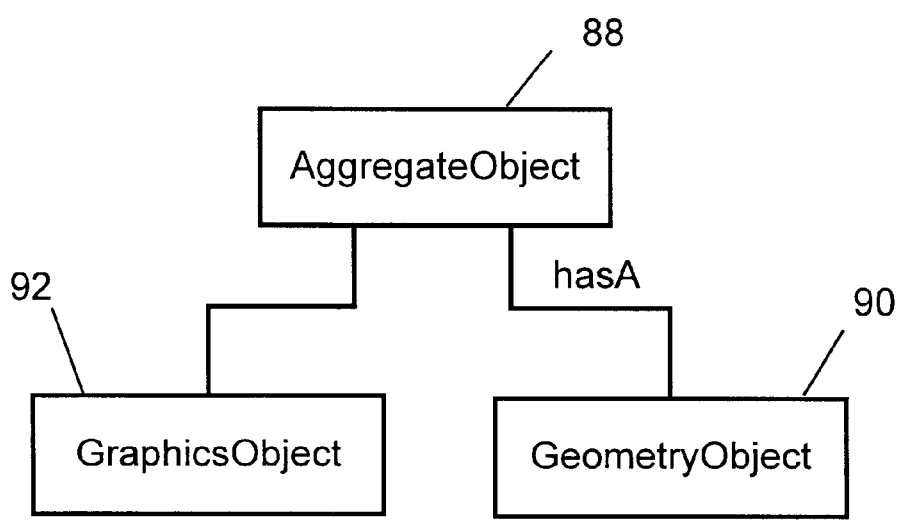
FIG. 12 shows the integration of geometry and graphics.

IGM implements the geometry and graphics integration through "object aggregation", as illustrated in FIG. 12. An "AggregateObject" class 88 encapsulates the common aspects of geometry and graphics representations of an object. A "GeometryObject" object class hierarchy 90 encapsulates geometric objects and operations on them in the geometry subsystem. Likewise, the "GraphicsObject" class hierarchy 92 describes objects that can be rendered on the screen. Finally, the AggregateObject class hierarchy 88 represents integrated objects. The three class trees are similar but are filled out to different levels of specificity, as required. An "IgmAction" class encapsulates methods required to traverse a topology graph and to generate an appropriate graphics representation for rendering. This addresses the shape representation mismatch between geometry and graphics engines.

Applications instantiate and manage AggregateObjects. An AggregateObject provides applications with a unified interface to the geometry and graphics subsystems, and high level methods for interactive geometry model building, editing, and rendering. It delegates graphics and geometry operations to its appropriate sub-objects.

IGM defines attribute mapping objects to solve attribute representation mismatch. These objects map attributes of geometric objects to Open Inventor graphical attributes, such as color, transparency, or texture, so that the property can be visualized. The IgmAction class inserts these graphical attributes when it generates a scene graph for rendering.

Consistency Management

The integration layer supports interactive work with complex geometric models, even though geometry operations may be much slower than graphics operations. IGM intentionally allows inconsistency between the graphics and geometry for the duration of an extended edit operation to improve performance. AggregateObjects monitor the changes that users make to the graphics representation of objects. Users "commit" changes to the geometric representation when desired to make the geometric model consistent with the graphical view. In simulation and model optimization, changes come from the geometry side. Graphics are updated to reflect the changes in the model.

To manage consistency between graphics and geometry, AggregateObject implements a finite state machine. A state has two variables, GeometryObject and GraphicsObject, that can be either "valid" or "invalid", depending of whether or not they represent the result of the last user interaction. AggregateObject manages the transition from one state to another.

ADAPTIVE VISUALIZATION

The following discussion describes basic algorithms for adaptive visualization.

The discussion focuses on the surface to bring out the concepts and basic algorithms. Visualization of geometry models, which will be described later, is based on the visualization of surfaces with additional constraints.

The discussion begins with the general concept of adaptive visualization. The algorithms for determining vertices to be rendered are then presented. This is followed by the method to triangulate the vertices. The discussion then describes how the operations can be organized into a multithreading environment to achieve better interactivity. Finally, a prediction technique to improve system quality is disclosed.

Methodology

In many applications, there may be millions of triangles on a large surface, more than the number of pixels on the screen. Even high end graphics hardware may not render all the triangles on such a large surface interactively. It is important to realize that for an interactive 3D graphics application, it is not necessary to render all the triangles in the scene. For example, for a surface with a large number of triangles, it is a waste to render all the triangles when the surface is far from the camera, since the triangles are smaller than the pixel resolution of the screen. When the surface is very close to the camera, a large number of triangles might fall out of the visible region. Those triangles need not be rendered either.

Given the limited graphics capability and the requirement for interactive visualization, it is critical to be able to change the triangular representation of the surface as the relative position of the camera and the surface changes. For example, when the surface is further away from the camera, a smaller number of triangles may be good enough to represent the surface; when the surface is closer to the camera, more triangles are used to provide finer resolution of the surface. Some existing approaches precompute and store different levels of details (LOD) of a surface. Based on the distance from the surface to the camera, a selected level of detail is rendered. This approach consumes memory to store the LOD. Further, when the surface is edited, the LOD has to be recomputed.

When the surface has a large extent, it is also important to change the size of the triangles in the same representation. For example, the surface region that is closer to the camera should have finer triangles than those regions that are further away from the camera.

Figure 13:
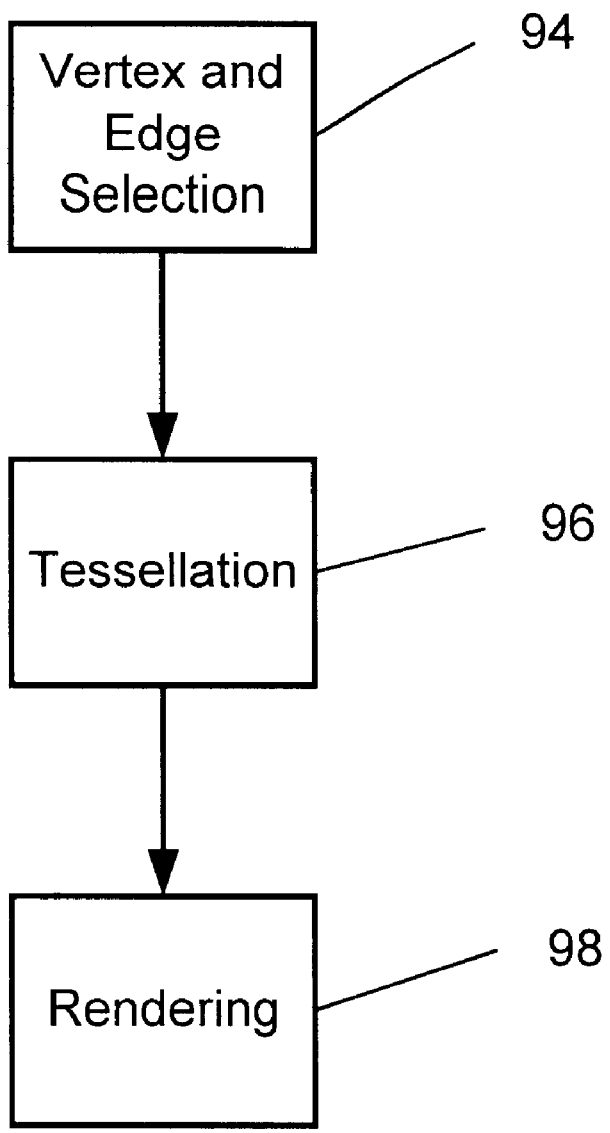
FIG. 13 is a flow chart of adaptive visualization according to the present invention.

Adaptive visualization refers to mechanisms that modify the visualization of objects according to given criteria. The system uses algorithms that generate and render triangles with variable resolutions across the surface, adapting to the relative position of the camera to the surface. This approach includes three major pipelined steps: vertex and edge selection 94, tessellation 96, and rendering 98, as shown in FIG. 13.

This pipeline applies to geometry models as well as individual surfaces. To visualize individual surfaces, in the first step, only vertex selection is required. Edge selection is needed for visualizing a geometry model. For each given camera position, the pipeline starts traversing the quadtree representation of the surface to determine the vertices to be rendered. The tessellation module triangulates these vertices to generate a triangle mesh. The rendering module renders the triangle mesh. The process repeats as camera position changes. Preferably, the surface parameterization is not required for geometry computation, but is used in adaptive visualization to generate triangle meshes.

Vertex Selection

Given a surface and a camera position, vertex selection chooses a subset of vertices on the surface for adaptive visualization. These vertices are connected into triangles to represent the surface and the triangles are rendered. The following discussion describes the algorithm for selecting such a subset of vertices at run time.

The surface is represented by a quadtree as described above. With the quadtree, vertex selection is to determine a set of quadtree nodes for visualization. This set of nodes has to be a node front of the tree. The critical vertices of the node front form the subset of vertices to be rendered.

The "bounding sphere" of a quadtree node is the minimum sphere that encloses all the simplices assigned to the node.

The determination of the node front is done by a traversal of the quadtree from the root. Two operations are involved during the traversal—view frustum culling and bounding sphere projection—which are described below.

View Frustum Culling

View frustum culling determines those parts of the surface that are outside of the view frustum so they do not need to be rendered. Each quadtree node has a bounding object defined such that the quadtree node is bounded spatially by it. The object may be a bounding sphere, axis aligned bounding box, oriented bounding box, or bounding polyhedron. Starting from the root node of the quadtree, the algorithm traverses the tree. If the bounding object of a node intersects the view frustum, the bounding sphere projection is applied (discussed below) to the node to determine if the traversal should continue. Otherwise, the node does not need to be visualized and traversal continues to the next node.

Bounding Sphere Projection

If a bounding object of a quadtree node intersects the view frustum, the node is projected to the screen. If the projected area is smaller than a prespecified minimum resolution, the quadtree node is in the node front. Otherwise, the traversal proceeds to the children of the node. The minimum resolution is specified as a radius or area in the screen space.

Projecting a 3-dimensional object to the 2-dimensional screen is an expensive operation. Typically the coordinates of an object go through a sequence of transformations from model to screen space. The transformation can be combined into a single homogeneous transform matrix.

The system provides an efficient way of projecting a quadtree node and determining if the tree traversal should proceed down from this node. The bounding sphere of the quadtree node is projected to the screen and used as an approximation to the actual quadtree node projection. Due to spherical symmetry, the similar triangles principle applies to the perspective projection geometry.

Figure 14:
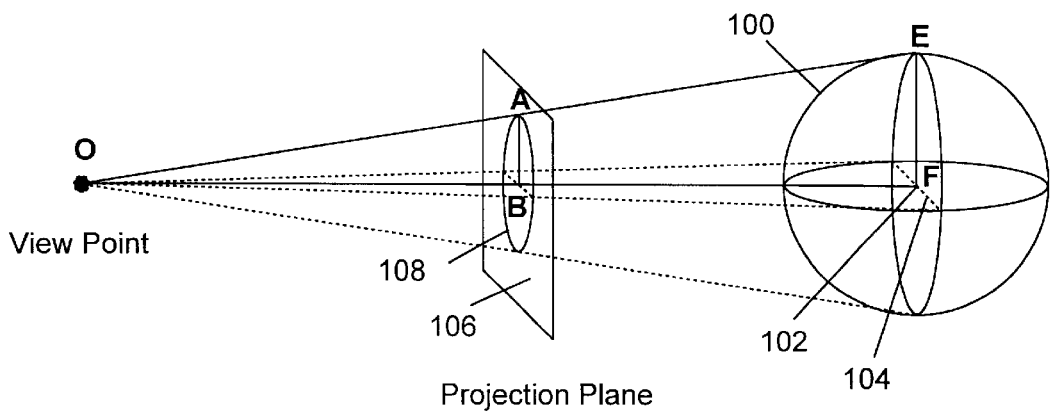
FIG. 14 illustrates bounding sphere projection.

The system provides an efficient way of projecting a quadtree node to the screen and a criterion for determining if the vertex selection should proceed down from this node. Each quadtree node has a bounding sphere 100 defined by a center 102 and a radius 104, as shown in FIG. 14. Assume a perspective camera. When the center of the sphere 100 is on the view direction of the camera, the projection of the sphere onto a projection plane 106 is a circle 108.

In FIG. 14, triangles OAB and OEF are similar triangles. Define d=OB is the distance from view point to the projection plane; D=OF is the distance from view point to the center of the sphere; R(circle)=AB is the radius of the projection of the sphere, and R(sphere)=EF is the radius of the sphere. The following relationship exists:

$$\frac{R(\text{circle})}{d} = \frac{R(\text{sphere})}{D} \quad (1)$$

Note that the projection is done in the camera coordinate system, while the bounding sphere of a quadtree node is in the world coordinate system. The issue becomes how to use Equation (1) without doing a coordinate transformation?

Recognizing that Equation (1) is about the distances, it is assumed that the transform from the world coordinate system to the camera coordinate system is a rigid-body transform that preserves angles and lengths. (An arbitrary sequence of rotation and translation matrices creates a matrix of this form.) With this assumption, it is possible to work in the world coordinate system and use and compute the distance in the camera coordinate system.

The camera position in the world coordinate system, the projection plane, and the bounding sphere of a quadtree node are known. The distance d and R(sphere) are thus known. D can be computed in the world coordinate system. The projection radius R(circle) can be computed using Equation (1). The next thing is to find the relationship between the R(circle) and its image in the screen coordinate system.

Figure 15:
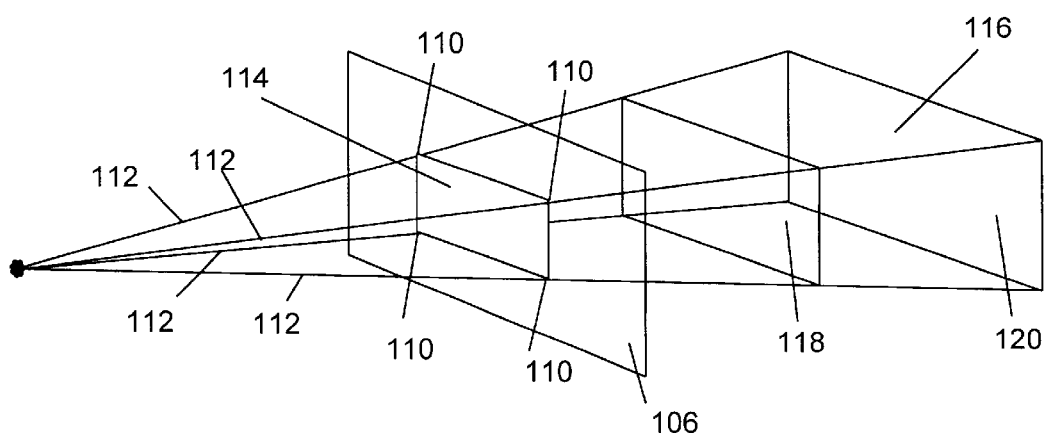
FIG. 15 illustrates the geometry of perspective viewing.

The graphics system scales the projected image of the objects into the viewport on the screen. Since the system is only concerned with distances, finding such scale is sufficient to find the image of R(circle). FIG. 15 illustrates the geometry of the perspective viewing. The four intersection points 110 of the four limiting projection rays 112 with the projection plane 106 form the four corners of the visible rectangular region 114 on the projection plane. Given the view frustum 116 (the solid trapezoid between front plane 118 and back plane 120), it is possible to compute the size of the visible region 114. Assume the aspect ratio of the viewport 122 (see FIG. 16) is the same as that of the view volume 116, then it is the same as the aspect ratio of the visible region 114 on the projection plane 106. This is true when the viewport transform introduces no deformation.

Figure 16:
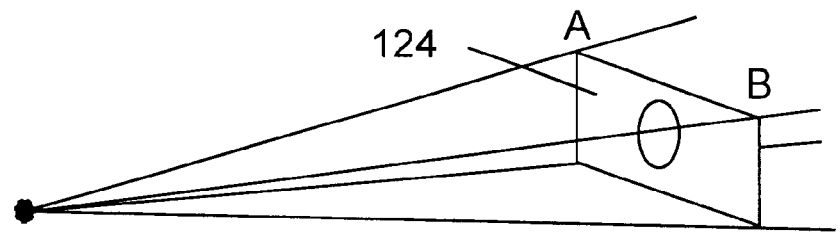
FIG. 16 illustrates the viewport transform.
Figure 16:
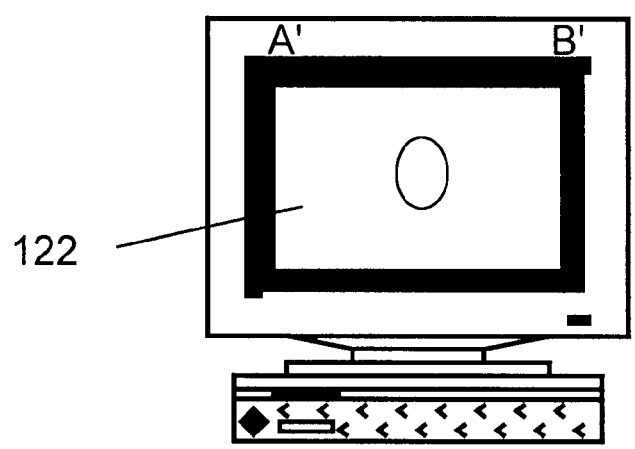

FIG. 16 shows the viewport transform. The projection region 124 is mapped to a region on the screen, the viewport 122. Let AB and A'B' be the lengths of the sides of projection region 124 and viewport 122, respectively. The ratio AB/A'B'=L defines the scale from the viewport 122 to the projection plane 106. Let the minimum projection radius on the screen be $R_{min}$(screen). Then the minimum projection radius on the projection plane is $$R_{min}(\text{proj}) = L \times R_{min}(\text{screen}) \quad (2)$$

From Equation (4) and Equation (5), we get the following equation for the sphere whose screen projection radius is the minimum radius $R_{min}$(screen):

$$R_{\min}^{D}(\text{sphere}) = \frac{L \times R_{\min}(\text{screen})}{d} \times D \quad (3)$$

For each camera position, $(L \times R_{min}(\text{sphere}))/d$ is a constant. When the radius of a bounding sphere at distance D is greater than $R^{d}\min(\text{sphere})$, the projection radius is greater then $R_{min}$(screen). This gives the following criterion:

$$R(\text{sphere}) > \frac{L \times R_{\min}(\text{screen})}{d} \times D = Const \times D \quad (4)$$

Given a quadtree node, if the condition in Equation (4) is true, the traversal should continue to the children of this node. Otherwise, this node is a leaf node of the active tree.

Figure 17:
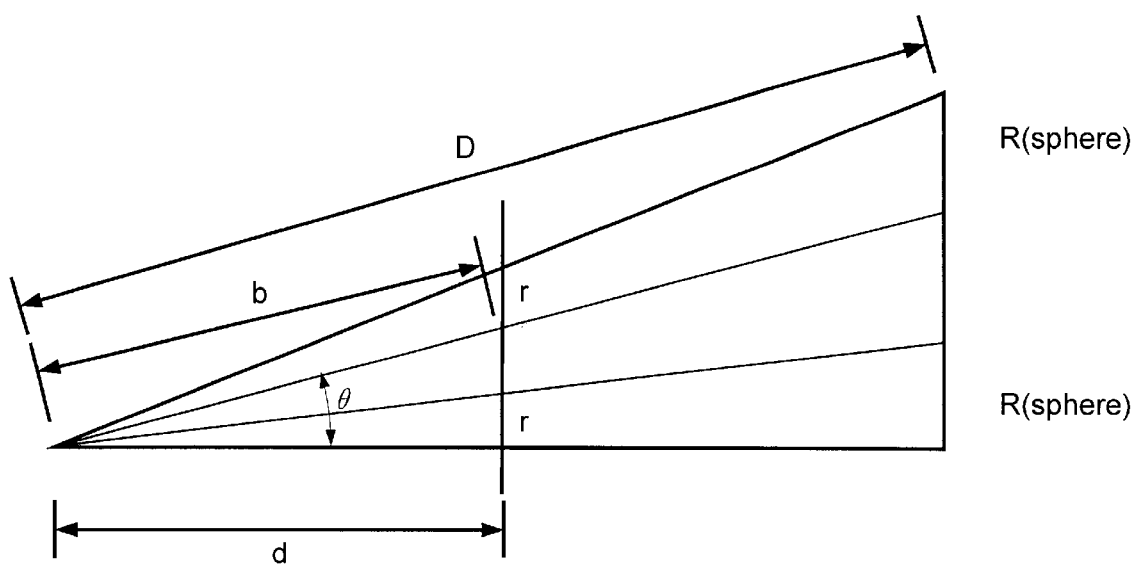
FIG. 17 illustrates the effect on bounding sphere projection of moving the bounding sphere off the view direction.

So far, the sphere is assumed to be centered in the view direction. The following examines the situation when the sphere is off the view direction. Because of the symmetry of the sphere, we can see the relationship in two dimensions, as shown in FIG. 17, where r=R(circle) is the radius of the projection of the sphere. According to similar triangles principle, we have the following:

$$R(\text{sphere}) > \frac{R(\text{circle})}{b} \times D \quad (5)$$

Since d=b×cosθ, Equation (1) is a special case of Equation (5) when the center of the sphere is in the view direction (θ=0) and hence d=b. In general, d≦b, therefore the following condition holds:

$$\frac{L \times R_{\min}(\text{screen})}{d} \times D > \frac{L \times R_{\min}(\text{screen})}{b} \times D \quad (6)$$

Therefore, the criterion in Equation (4) applies to quadtree nodes that are off the view direction as well.

Thus, in summary, if the following condition is true, the traversal should proceed to the children of the node N:

$$R(\text{sphere}) > \frac{L \times R_{min}(\text{screen})}{d} \times D = K \times D \quad (7)$$

K is only computed once when user changes the viewport size, the minimum resolution, or the angle of the field of view, or when the distance d changes. Such changes are outside of the tree traversal. When the viewport size increases, K decreases and more bounding spheres satisfy the condition above. Hence, more triangles will be rendered.

During vertex selection, at each node, the distance D is computed. If the above condition is true, the traversal proceeds to the children of the node. Otherwise, the node is added to the node front, and the children of the node need not be visited. As shown above, the allowable projection size of a quadtree node off the view direction is slightly larger than one on the view direction. The effect on the screen is that the triangles are finer around the center of the viewport and possibly coarser away from the center. This is acceptable since a user tends to look at center of the viewport.

The bounding sphere projection enables efficient decision making during the quadtree node selection. Only one distance, one additional multiplication, and one comparison are needed for each decision. The drawback is that when most of the surface normals are perpendicular to the view direction, for example, looking along a plane, more triangles than necessary are generated. To overcome this drawback, the normal of the surface is used to assist the decision of the triangle resolution.

Figure 18:
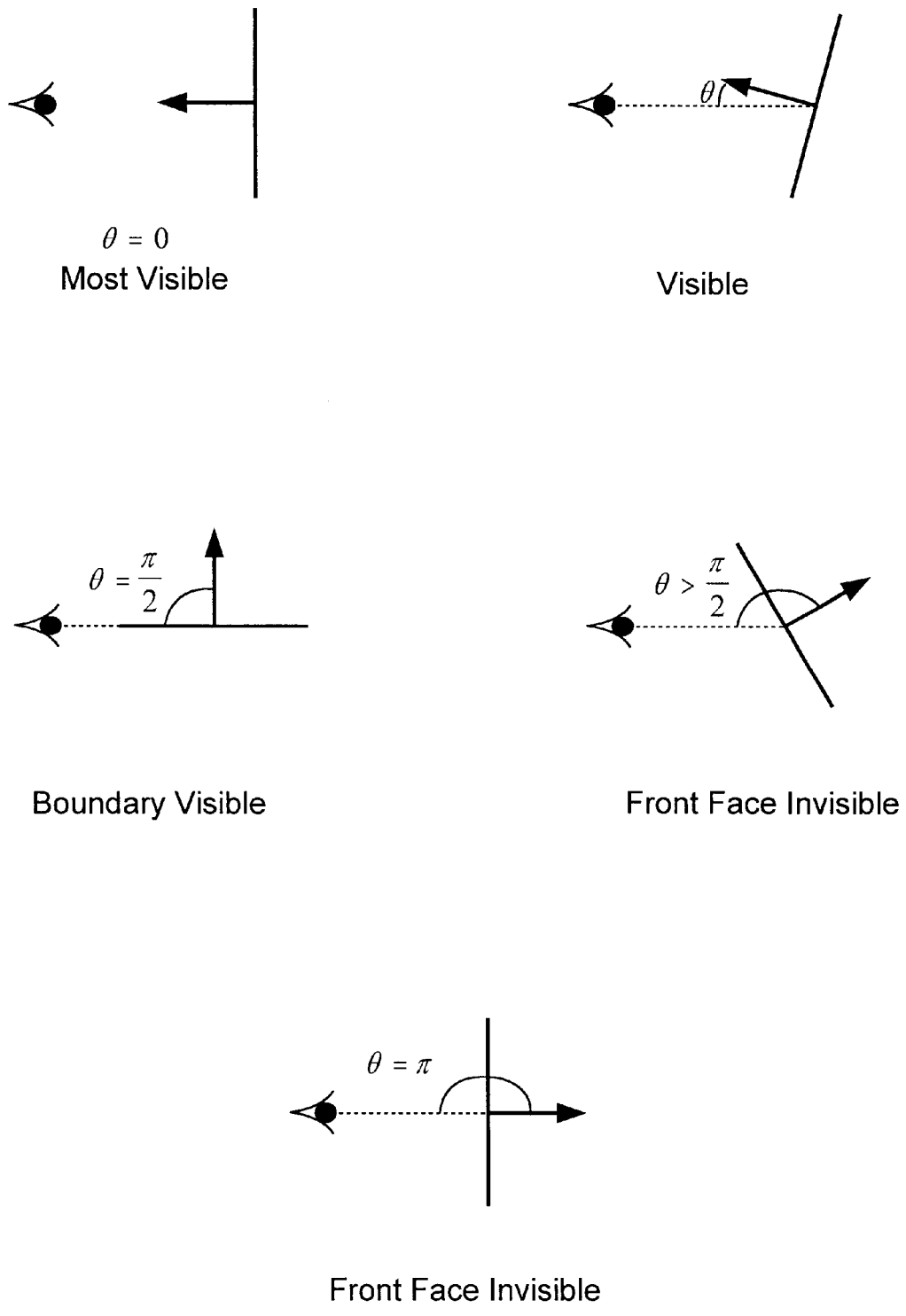
FIG. 18 illustrates the visibility of an oriented plane with respect to the view direction.

FIG. 18 shows the visibility of an oriented plane with respect to the view direction. Let $\theta$ be the angle between view direction and the normal of the plane, as shown in FIG. 18, with $-180 \leq \theta \leq 180$. The visibility of the front face of the plane is proportional to $\cos\theta$. When $\cos\theta \geq 0$, the front face of the plane is visible. Otherwise, the plane is invisible. As $|\theta|$ decreases, more of the plane becomes visible. Therefore a function of $\cos\theta$, $f(\theta)$, that is inversely proportional to $\cos\theta$, can be used to scale the right hand side of Equation (7) for $-90 < \theta < 90$. $f(\theta) = 1$ for $\theta = 0$. $f(\theta) > 1$ for $|\theta| > 0$. This means that when a surface is less visible because of its surface orientation, a smaller number of larger triangles will be generated. To minimize the computation at run-time, $f(\theta)$ can be implemented as a small look up table.

To use the above feature, each quadtree node can keep an average normal and standard deviation of the normals of the simplices belonging to the node. This can be computed recursively bottom up from the leaf nodes. The scaling function $f(\theta_\Delta\theta)$ is then a function of both the average normal $\theta$ and the standard deviation $_{66}\theta$. The larger the deviation, the smaller the effect of the normal to the projection. With the scaling function, Equation (7) becomes:

$$R(\text{sphere}) > f(\theta, \Delta\theta) \times \frac{L \times R_{min}(\text{screen})}{d} \times D = f(\theta, \Delta\theta) \times K \times D \quad (8)$$

Let $g = f^2$ and $C = K^2$. Equation (8) is equivalent to the following equation where square root computation for distance D is avoided:

$$R^2(\text{sphere}) > g(\theta, \Delta\theta) \times C \times D^2 \quad (9)$$

Vertex Selection Algorithm

Figure 19:
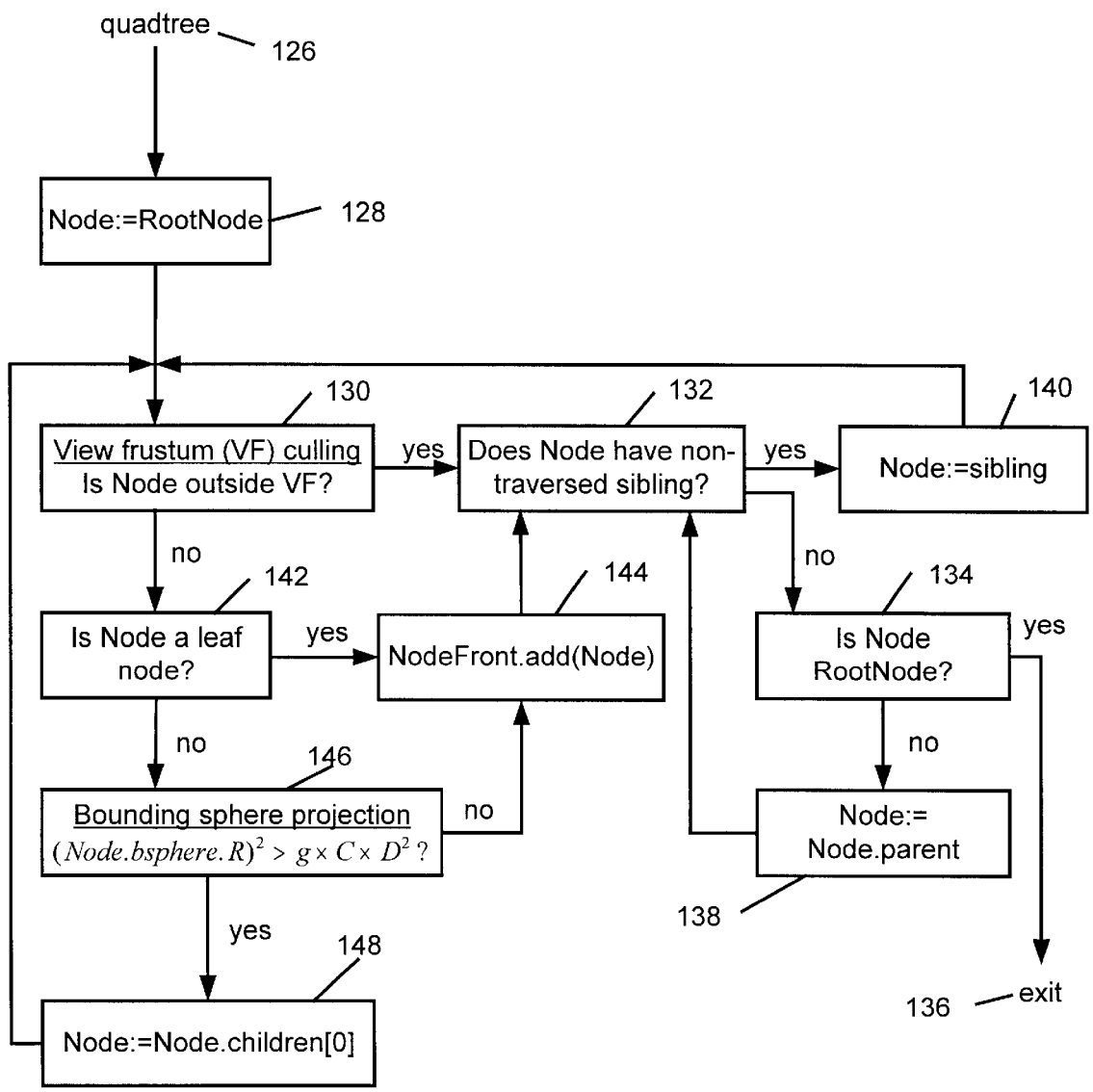
FIG. 19 is a flow chart of a vertex selection algorithm.

Vertex selection selects a subset of vertices on a surface according to the given camera position. The selection algorithm finds a node front of the quadtree by traversing the tree, and uses the critical vertices of the node front as the selected subset. The two basic criteria used in tree traversal are view frustum culling and bounding sphere projection. One embodiment of the vertex selection algorithm is illustrated in FIG. 19. The algorithm is primarily a depth-first traversal.

The algorithm begins with a quadtree 126. The root node of the quadtree is first selected [block 128]. The algorithm then enters a loop. First, the algorithm performs view fustrum culling by determining if the selected node is outside the view fustrum [block 130]. If it is, the algorithm determines if the selected node has a non-traversed sibling [block 132]. If it does not, the algorithm determines if the node is the root node [block 134]. If it is, then the algorithm exits [block 136].

Returning to block 134, if the selected node is not the root node, the parent node of the selected node is selected [block 138] and the algorithm returns to block 132.

Returning to block 132, if the node has a non-traversed sibling, then the non-traversed sibling node is selected [block 140] and the algorithm returns to block 130.

Returning to block 130, if the node is not outside the view frustum, the algorithm determines if the node is a leaf node [block 142]. If it is, the node is added to the node front [block 144] and the algorithm continues with block 132.

Returning to block 142, if the node is a leaf node, the algorithm performs a bounding sphere projection [block 146] by determining if the condition of Equation (9) is satisfied. If it is not, then the node is added to the node front [block 144]. If the condition of Equation (9) is satisfied, then the zeroth child of the selected node is selected [block 148] and the algorithm returns to block 130.

It will be recognized that a more sophisticated traversal strategy could be used to achieve better performance.

Tessellation

The selected vertices are connected into a triangle mesh for visualization. This process is called "tessellation" or "triangulation". The resulting triangle mesh is an approximation of the original surface. The area that is closer to the camera has finer resolution and the resolution becomes coarser as the area is farther away from the camera. The preferred triangulation technique is "Delaunay triangulation". One advantage of this approach is less memory usage, since the triangle mesh is constructed during Delaunay triangulation and is not stored. A Delaunay triangulation of a point set is a triangulation of the point set with the property that no point in the point set falls in the interior of the circumcircle (circle that passes through all three vertices) of any triangle in the triangulation.

The tessellation is done in the parameter space of the surface. For a surface without curves on it, except the boundary, and without holes, the Delaunay tessellation can be used directly. Otherwise, "constrained" Delaunay tessellation might be used.

In an interactive 3D application, the camera might move continuously. Therefore, when the camera moves from one position to another, most of the points on the surface that were present in the previous camera position are also visible in the current camera position. Some points are removed and some points are added. In this case, the incremental and decremental Delaunay tessellation may be used. While incremental Delaunay tessellation is well studied and widely used, there is little reference, if any, about decremental Delaunay tessellation.

Figure 20:
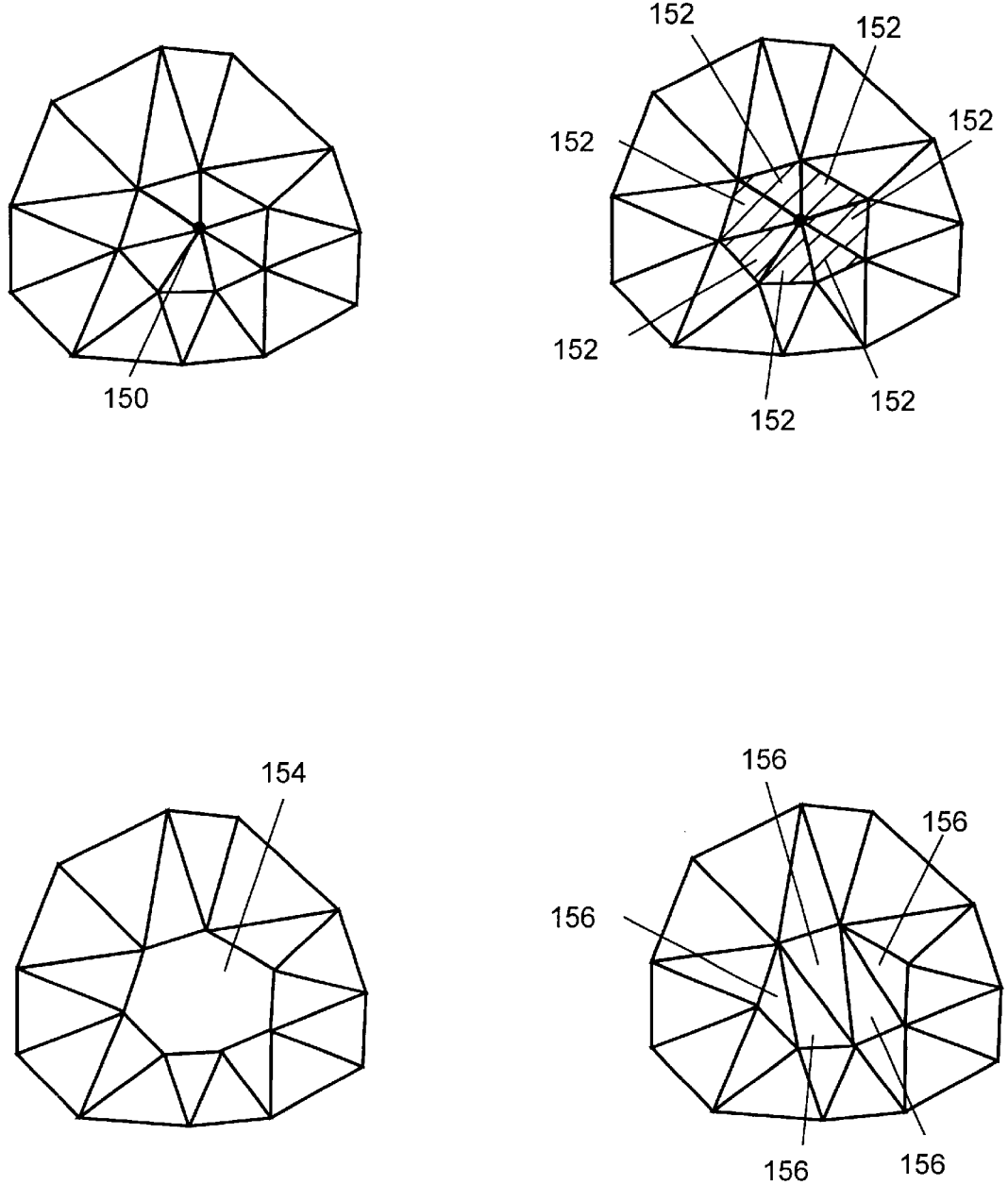
FIG. 20 illustrates decremental Delaunay tessellation.

Given a Delaunay triangulation T, of a point set P, and a subset, Q of P, it is desired to construct a Delaunay triangulation, U, of Q. There are two options: call the Delaunay tessellator for Q or exploit the existing Delaunay triangulation, T, of P. Decremental Delauney tessellation removes the points, R=P\Q (\ is the set subtract operator) from the existing Delaunay triangulation, T, and maintains a Delaunay triangulation on the remaining points, Q. Decremental Delaunay tessellation can be implemented as follows. Remove all the triangles in T that have a corner point in R, and remove R. Tessellate the resulting holes by finding their boundary edges and apply constrained Delaunay tessellation. Note the re-tessellation is a local operation. For example, to remove a vertex 150, as illustrated in FIG. 20, find all the triangles 152 in the triangulation that have vertex 150 as one of their comers. These triangles are eliminated from the triangulation, leaving hole 154 and the resulting hole is retessellated into triangles 156 to satisfy the Delaunay condition. Alternatively, one can apply unconstrained Delaunay tessellation to each hole and remove triangles outside the hole. Removing a point on the boundary of the triangulation requires care as no holes are created. The unconstrained Delaunay tessellator can be applied locally, and the correct collection of triangles can be selected.

Figure 21:
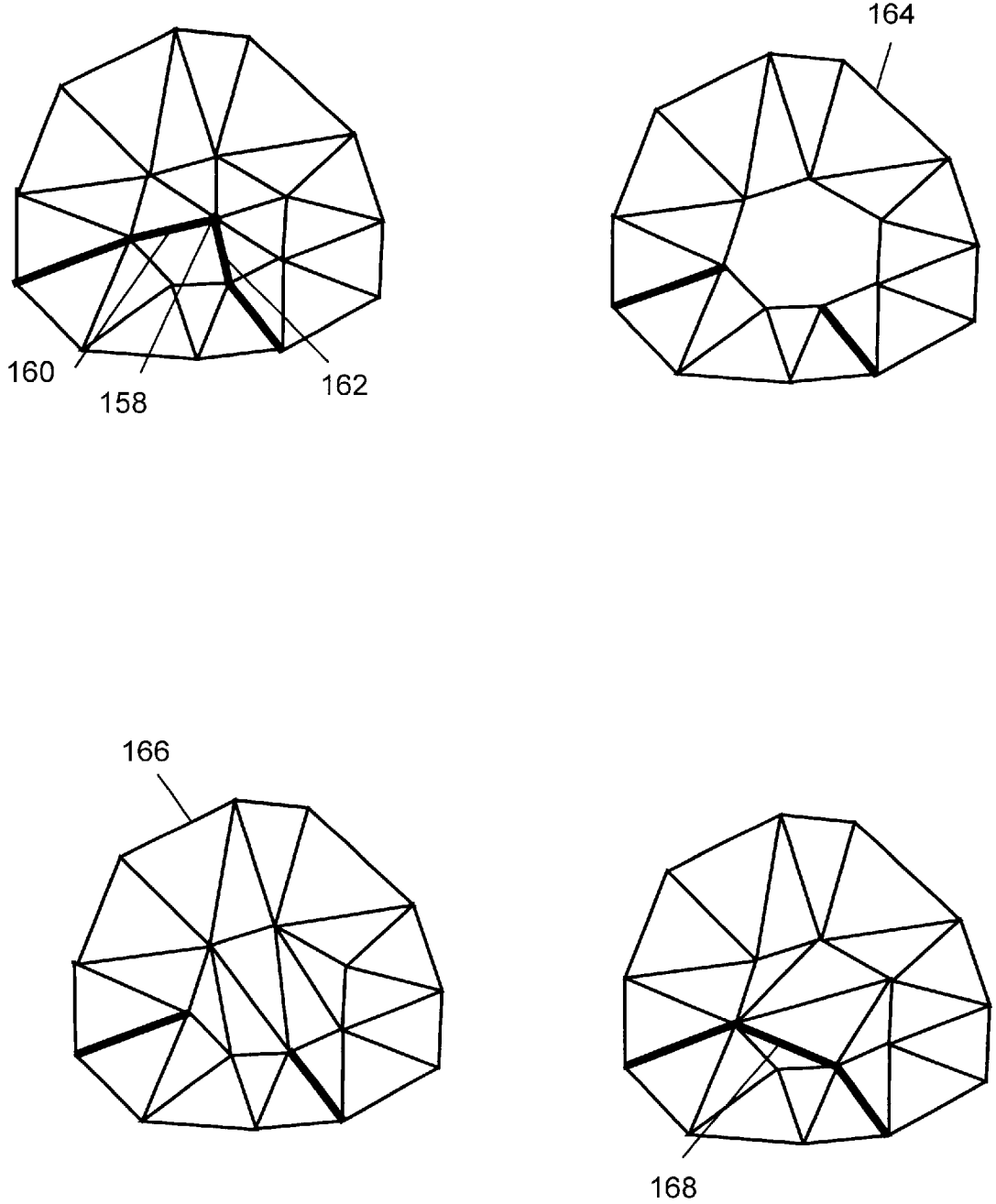
FIG. 21 illustrates using constrained Delaunay tessellation in decremental Delaunay tessellation.

There is a similar definition for constrained decremental Delaunay tesselation. However, when constraining edges are removed, they are typically replaced with a coarsened collection of constraining edges. For example, if a point lies on two constraining edges, to remove this point the two constraining edges maybe replaced by one constraining edge joining the other two points on the original constraining edges. A decremental Delaunay tessellation can be built without the new constraints and then the new constraints can be inserted. For example, as illustrated in FIG. 21, if a vertex 158 lies on two constraining edges 160 and 162, to remove vertex 158, the two constraining edges 160 and 162 maybe replaced by one constraining edge joining the other two vertices on the original constraining edges. The triangles having vertex 158 as a vertex can be removed 164, a decremental Delaunay tesselation can be built without the new constraints 166 and then the new constraints can be inserted 168.

Let V1 be the set of vertices visualized for camera position C1, and T1 be the resulting triangulation of the corresponding point set P1 of V1 in parameter space. Let V2 be the set of vertices to be visualized for camera position C2, and P2 be the corresponding point set. It is desired to find the triangulation T2 for P2. Let D=P1\P2, E=P2\P1. Let ti(X) and td(X) be the time required for incremental and decremental Delaunay triangulation, respectively, for the point set X. If td(D)+ti(E)<ti(P2), then D is removed from T1 via decremental Delaunay tessellation resulting in T1' and E is added to T1' via incremental Delaunay tessellation resulting in T2. Otherwise, P2 is tessellated directly to generate T2.

Multi-threading

As described earlier and as illustrated in FIG. 13, there are three major steps in the adaptive visualization pipeline. These three steps can operate sequentially, one after another. The rendering frame rate is constrained by the total time needed by the three steps. To increase interactivity, a multithreading technique is applied with one or more threads being responsible for each step. For simplicity in the following description, assume each step has one thread. In this case, the rendering frame rate is constrained by the longest of the three steps.

Initially, the vertex selection thread traverses the quadtree finding the vertices to be rendered. The vertices are passed to the tessellation thread. The tessellation thread generates triangles, which are passed to the rendering thread. The tessellation step is the computational bottle neck of the pipeline. The rendering thread may keep rendering the same set of triangles until the next set of triangles is ready.

Let $V_1$ be the set of vertices that the tessellation thread is processing, and $U_1 \subset V_1$ be a subset that has been processed. The vertex selection thread selects a set of vertices $V_2$. If the tessellation thread has finished, $V_2$ is passed to the tessellator. Otherwise, $V_2$ is compared with $V_1$ and the timing for processing these vertices are also compared. Delaunay tessellation takes NlogN time to process a vertex set V of N vertices. Let t(V) be the time for tessellating a vertex set V. If $t(V_2) < t(V_1) - t(U_1)$, that is, the time to process $V_2$ is less then the time to process the rest of $V_1$, the tessellation process is aborted. $V_2$ is passed into the tessellator. Otherwise, the tessellator continues to process $V_1$.

This is a direct approach to keep all threads busy. However, there is some wasted computation. To alleviate the problem, a predictive computation technique is used.

Predictive Computation

Figure 22:
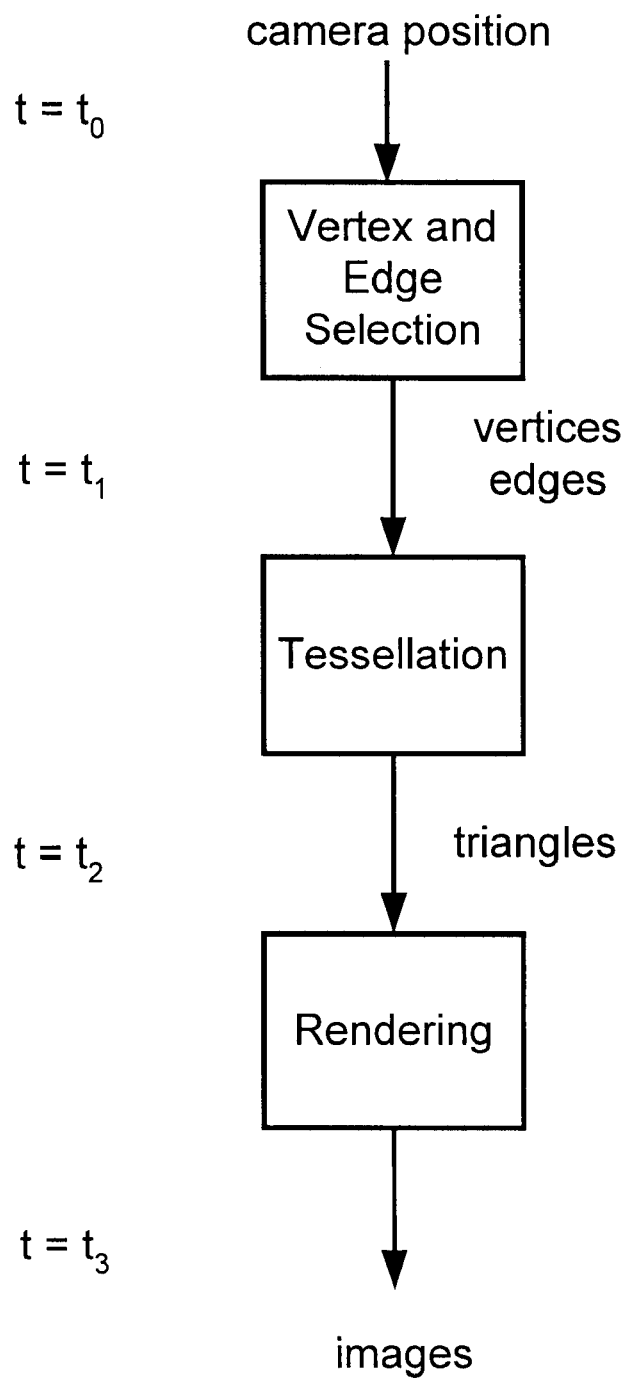
FIG. 22 illustrates the timing of the elements of adaptive visualization according to the present invention.

Since each stage in the pipeline, illustrated in FIG. 13, takes some time to process the data, there is a delay in what is actually rendered on the screen with the given camera position. This is shown in FIG. 22. At time $t_3$, the image on the screen is generated for the camera position at $t_0$. The delay is $\Delta t = t_3 - t_0$. The user might not feel the delay if such delay is about the same for each frame. But the resolution of the rendered image might actually be under or exceed specification. On the other hand, some computation is wasted. This come from two sources. First, selected vertices from the vertex selection thread might not be used since the other threads might not finished processing data from the previous camera position. Secondly, the computation in the tessellation thread might become invalid when the camera position changes more rapidly. The system addresses these problems to achieve better performance and better quality.

Looking again at FIG. 22, if at time to we can predict the camera position at time $t_3$, then at time $t_3$ we will see image for $t_3$, if the prediction is correct. As described earlier, vertex selection determines the final image, which is only adaptive to the camera position. The computations include distance calculations and scalings. The actual matrix of the graphics pipeline is not involved. Therefore, we can model the camera trajectory and make predictions to the future camera positions. The modeling process is independent of the process pipeline shown in FIG. 22, and little computation is involved as compare to the pipeline. Therefore, we can sample the camera position at a much higher rate to update the camera trajectory model in order to get better predictions.

Some well known filtering techniques, for example Kalman filtering, can be used to model the dynamics of the camera position.

Scalability

Figure 23:
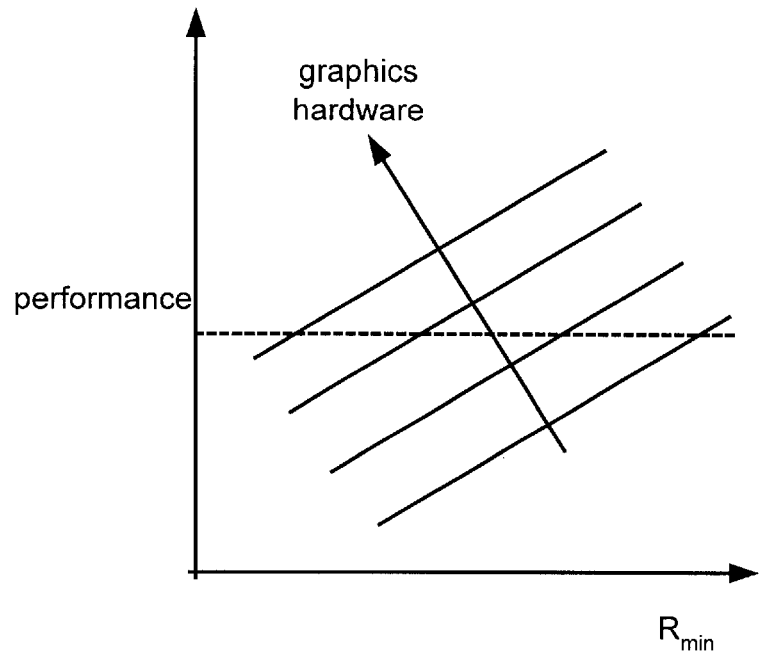
FIG. 23 illustrates the relationship between quality and performance of the adaptive visualization system according to the present invention.
Figure 23:
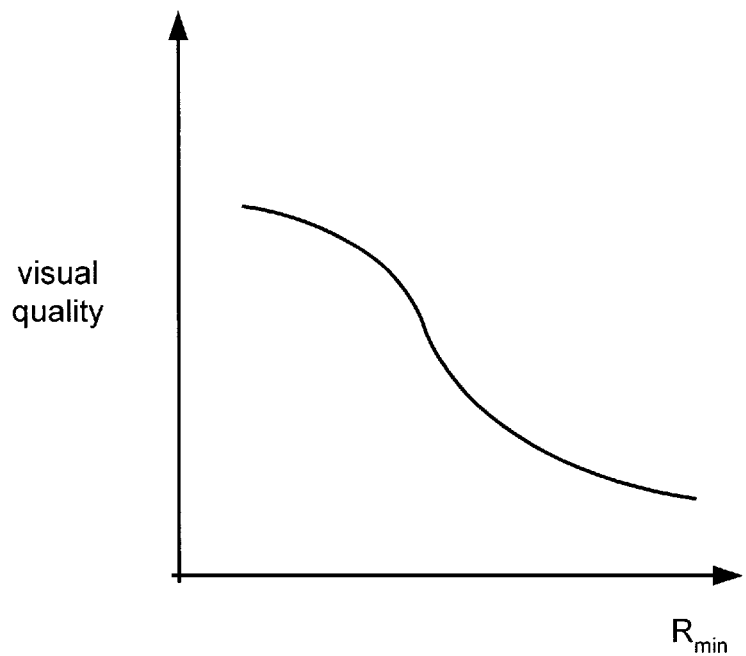

From Equation (7), adjusting $R_{min}$, the minimum pixel resolution, adjusts the triangle resolution and the tessellation performance. For a range of computer and visualization power, from laptops to super computer, one can trade-off the visual quality by adjusting $R_{min}$ to achieve nearly constant frame rate as shown in FIG. 23.

ADAPTIVE VISUALIZATION OF GEOMETRY MODELS

Geoscience models are geometry models made of geological features, such as faults and horizons. The geometry model is represented by a boundary representation as discussed above. The visualization of the geometry model is based on the technology described above. The system uses additional techniques to handle the complexity of the geometry model and to enhance performance.

Model Coherence

The geometry model is constructed via Irregular Space Partitioning (ISP). A straight-forward way to render such a geometry model is to render its surfaces. This is satisfactory if the model is coherent, if the model is rendered at its full resolution, and if there is large enough memory and hardware power.

First assume the model is coherent. When the model is large, to achieve interactive performance, adaptive visualization is needed. One of the requirements for visualizing a geometry model is to preserve the macro topology of the model. Recall that with adaptive visualization, a surface is decimated dynamically with various resolutions across the surface. If each surface in the model is decimated independently, there may be cracks between adjacent surfaces since they may be decimated at different resolutions. This may change the macro topology of the model. To prevent this problem, we use the model decimation algorithm that uses the same set of 1-cell vertices for the surfaces intersecting at the 1-cell, described in U.S. patent application Ser. No. 09/163,075, entitled MODELING AT MORE THAN ONE LEVEL OF RESOLUTION. The 1-cell vertices constrain the decimation of the surfaces.

Figure 24A:
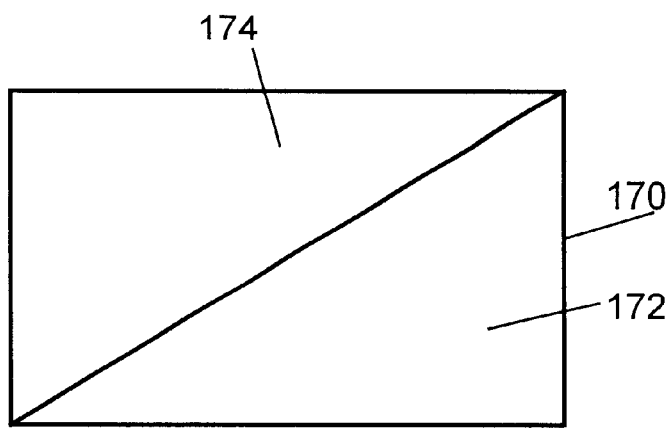
FIGS. 24a, 24b and 24c illustrate making a model coherent.
Figure 24B:
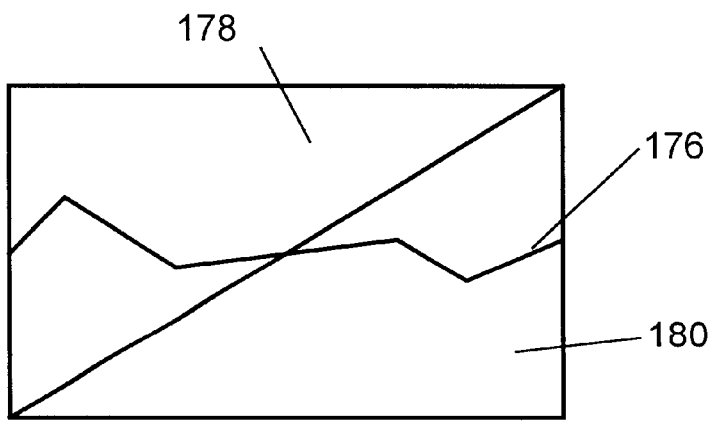
Figure 24C:
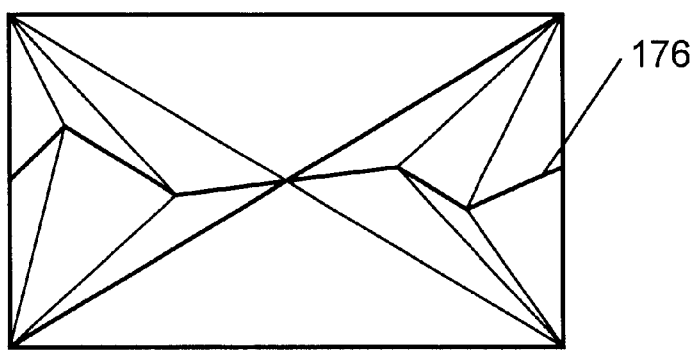

There is a great advantage being able to work on the model that is not coherent, since making coherency is the most expensive operation during model construction. However a non-coherent model presents a greater challenge. In a non-coherent model, adjacent cells that are distinct topological entities may not be geometrically separated. See, for example, FIG. 24*a*, in which a volume 170 has been tessellated into two triangles 172 and 174. Classification of a surface 176 into the volume 170 produces two cells 178 and 180, as shown in FIG. 24*b*. But we cannot separate cells 178 and 180 because they do not have their own geometric representation. The triangles 172 and 174 straddle both of the two cells 178 and 180. This problem is resolved by making the modelcoherent, by retessellating the two cells 178 and 180 to respect the macro-topology of the model, as shown in FIG. 24*c*.

Figure 25:
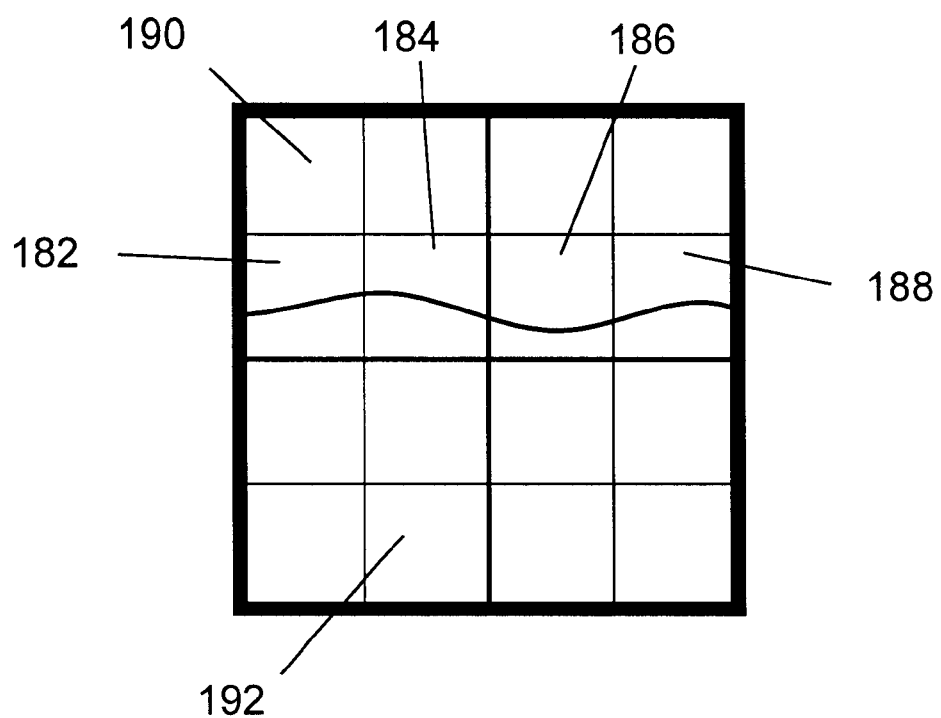
FIG. 25 illustrates a quadtree node straddling two or more 2-cells.

It can be seen that for a non-coherent model, there is no one to one correspondence between cells and their maps, which map from the parameter space (1D or 2D) to 3D space. For a large model with quadtree representations, this means 2-cells that are split from the same surface share the same quadtree. A quadtree node, and hence its parents, might straddle two or more 2-cells. For example quadtree nodes 182, 184, 186 and 188 straddle 2-cells 190 and 192 in FIG. 25. This might be fine if it is not necessary to distinguish the 2-cells for visualization. But applications usually require that 2-cells be distinguished for interaction.

The system efficiently renders non-coherent and coherent geometry models using algorithms for generating a decimated triangulated model that preserves the intersection curves of the original model, for generating and rendering the topologically simplified model, and for decimating and view-frustum culling 1-cells.

Methodology

The adaptive visualization pipeline for surfaces, illustrated in FIG. 13, applies to geometry models as well. A geometry model contains many surfaces and many 1-cells that are shared by more than one surface. For a non-coherent model, multiple surface cells might share the same quadtree. The adaptive visualization of the model needs to ensure that the topology of the model is respected. In particular, the intersection curves and the surfaces sharing the curves should be rendered coherently. There should be no cracks or gaps between such surfaces. The following algorithm addresses these issues, and applies to coherent models, non-coherent models, and individual surfaces.

The pipeline selects vertices and edges from each quadtree and from each 1-cell in the model, decimates the model using the algorithm described in U.S. patent application Ser. No. 09/163,075, entitled MODELING AT MORE THAN ONE LEVEL OF RESOLUTION, using edges as constraint for the decimation, and then renders the decimated model. If the model is not coherent, the 1-cells are made coherent. This is not expensive and needs to be done only once.

Figure 26A:
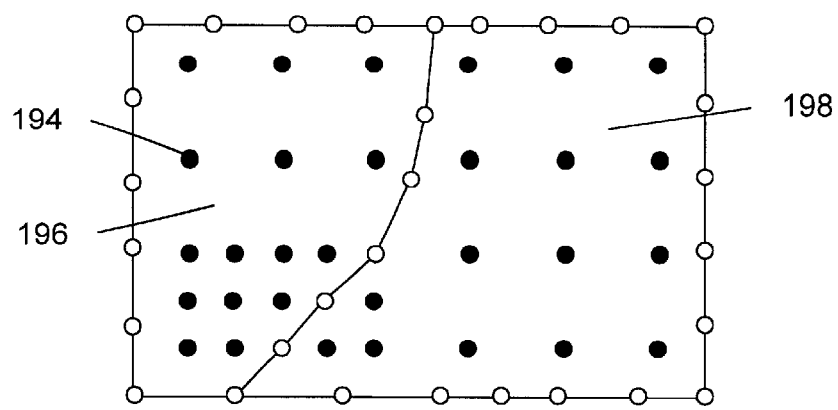
FIGS. 26a, 26b and 26c illustrate tessellation of a non-coherent model.
Figure 26B:
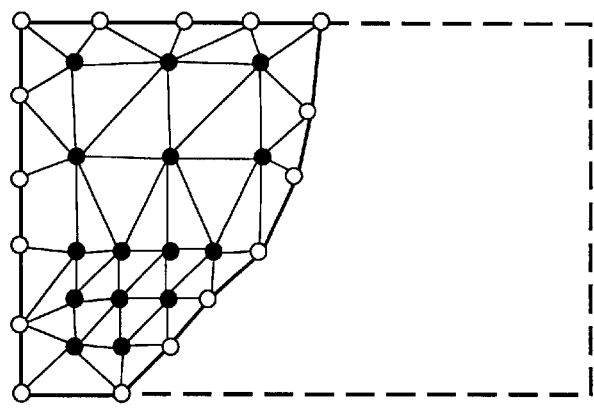
Figure 26C:
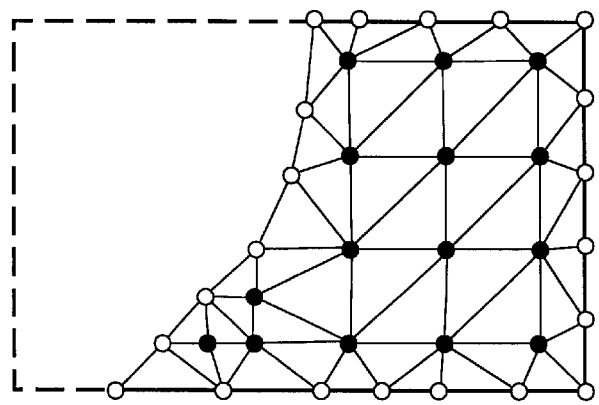

1. Vertex and edge selection:
   For each 2-cell in the model, find its quadtree. If the quadtree has not been traversed, traverse the quadtree to find vertices to be rendered using the algorithm described above. If the quadtree has been traversed, go to the next 2-cell. Note that more than one 2-cell might share the same quadtree for non-coherent model. The quadtree should only be traversed once.
   Remove vertices that also belong to 1-cells or 0-cells.
   Find all the 0-cell vertices that lie on a 2-cell, and add them to the selected vertex list of the 2-cell.
   Extract all 1-cells from the model. Select a collection of vertices and hence the edges from these 1-cells. (1-cell decimation will be described below.)
2. Tessellation. The collection of the vertices and edges from an 1-cell are used as constraints in the tessellation by all the 2-cells that share this 1-cell. For each 2-cell, tessellate selected vertices in the parameter space of this 2-cell using its 1-cell vertex collections as constraints. For a non-coherent model, some of the vertices that participate the tessellation are outside of the 2-cell. An example is shown in FIG. 26*a*. The vertices, e.g. 194, are selected from the quadtree that represents the original surface. The surface is classified into two cells 196 and 198. Therefore, vertices on cell 198 are outside of cell 196, and vice versa. The vertices outside of a cell are thrown out during tessellation of that cell. Only vertices inside the 1-cell constraints remain. With this approach, one traversal for vertex selection is done for each quadtree, and the tessellation runs as many times as the number of 2-cells sharing this quadtree.
3. For each 2-cell, build a triangle mesh in the three dimensional space using 3D coordinates of the vertices of the triangle mesh in the parameter space, as shown in FIGS. 26*b* and 26*c*.
4. Visualization. The visualization module renders the triangle meshes generated by the tessellator for each 2-cells. Since the same collection of 1-cell vertices are used as the constraints for the 2-cells sharing the 1-cell, there are no cracks in the decimated model.

When the camera position changes, the pipeline executes for the new camera position.

Visualization of Non-Coherent Models

Figure 27A:
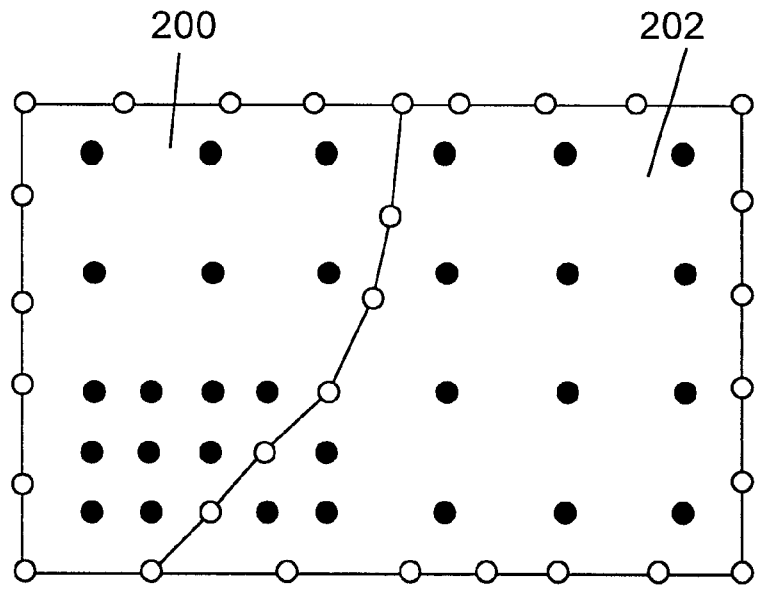
FIGS. 27a and 27b illustrate tessellation of a non-coherent model.
Figure 27B:
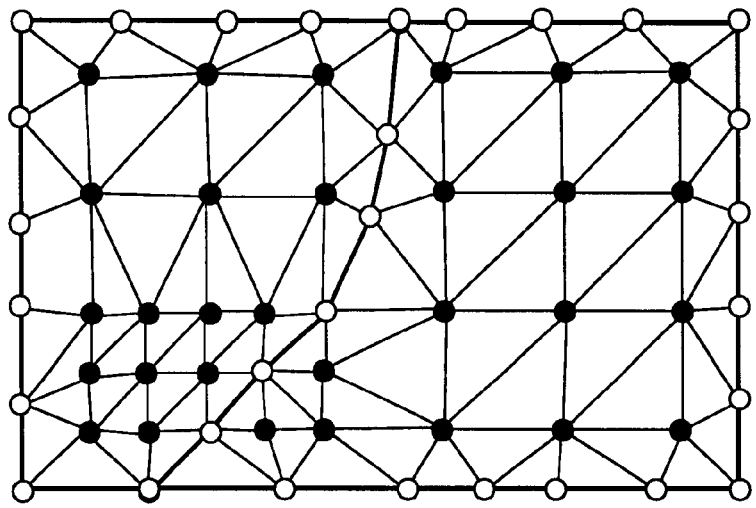

An alternative model decimation algorithm utilizes the nature of the non-coherent model. Vertices and edges are selected. Instead of tessellating each 2-cell, tessellation applies to each 2D map that is to be visualized in the model. For example, in FIG. 27a, there are two 2-cells 200 and 202 on the 2D map, that is, the two cells share the same quadtree. Instead of tessellating each 2-cell as described above, the vertices selected from the 2D map are tessellated once, as shown in FIG. 27b. For each 2D map, the selected 1-cell vertices that are also on this 2D map are constraints to the tessellation. Taking the selected 2D vertices on the map and 1-cell vertices, constrained Delaunay tessellation is applied.

Define a connected mesh component of a triangulation as the largest set of connected triangles bounded by a closed 1-cell edge loop. When a 2D map has N 2-cells on it, the constrained Delaunay tessellation results in N connected components. These components are found using the triangle-to-vertex connectivities. The underlying geometry engine helps to find correspondences between mesh components and 2-cells. Since vertices selected from 1-cells are used to constrain the tessellation, and they are shared by surfaces, this algorithm prevents cracks between 2-cells. FIG. 27b shows an example.

The performance comparison of this algorithm and the algorithm for tessellating coherent surfaces may depend on the complexity of the macro topology on a given 2D map. Let N be the number of vertices. The complexity of Delaunay triangulation is NlogN. Let $N_t$ be the total number of vertices selected from a quadtree of a 2D map. Assume there is more than one 2-cell on the 2D map. Let $N_i$ be the number of vertices on one of the 2-cells. Then the complexity of the Delaunay triangulation for this 2-cell is much more than $N_i log N_i$ since all $N_t$ vertices are visited during the triangulation. The algorithm presented should have better performance as the number of 2-cells on a 2D map increases since the tessellation is only run once. In practice, since the pipeline process repeats as the viewing position changes, one decimation algorithm is used for some view positions and the other algorithm for other positions. The repeating process can use the algorithm that has better performance.

Boundary Decimation

Figure 28A:
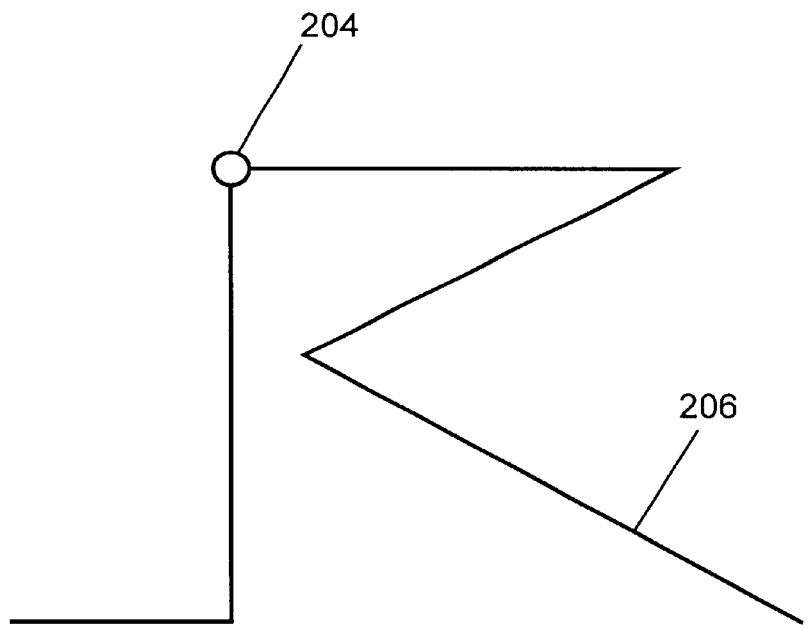
FIGS. 28a and 28b illustrate the formation of a self-intersection when a vertex is dropped from a 1-cell.
Figure 28B:
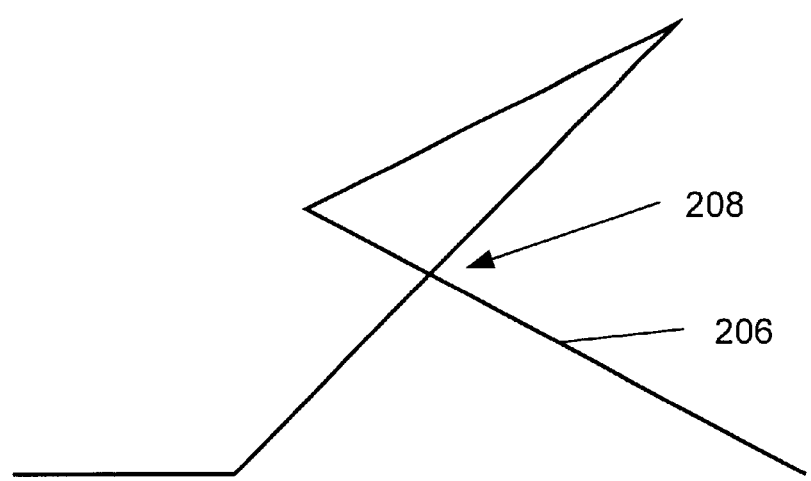

The quadtree provides a good way of decimating surfaces. We could leave the 1-cells undecimated if individual surfaces or models with a few number of surfaces are visualized. However, with models consisting of a large number of large surfaces, using undecimated 1-cells as the constraints to the tessellation severely limits the performance The main requirement for decimating 1-cells is to prevent self-intersections and intersections between 1-cells, which form the boundary of a 2-cell, in the 2-cell's parameter space. FIGS. 28a and 28b shows an example of self-intersection. When a vertex 204 on a curve 206 is removed, the curve 206 self-intersects at point 208. The intersections resulting from decimation not only change the macro topology of the geometry model, but also cause tessellation failure. To overcome this problem, the 1-cells are decimated first. This decimation can be done in the 1-cell's parameter space or in image space. The refinement method described in W. Cho, T. Maekawa, and N. Patrikalakis, Topologically reliable approximation of composite Bezier curves, Computer Aided Geometric Design, vol. 13, 1996, pp. 497–520, is then applied to find intersections and to refine decimation locally until all the intersections are resolved.

For each 2-cell, get the decimated 1-cells that form the boundary of the 2-cell. Detect and correct 1-cell intersections by refining the 1-cells' decimations. Intersection detection and refinement is done in the 2-cell's parameter space.

A decimated 1-cell may be refined by more than one 2-cell that shares this 1-cell.

By analogy with a 2-cell, it is possible to build a tree for a 1-cell. While for 2-cells the natural tree to choose was a quadtree, for 1-cells the natural tree to choose is a binary tree. It will be understood that the tree need not be a binary tree but can be a tree with any number of children for each node, such as a quadtree. A binary tree is a tree where each node has two children, except the leaf nodes which have no children. For each 1-cell in the geometry model, a binary tree is built by assigning each simplex of the 1-cell to a unique leaf node of the tree. In the example illustrated in FIG. 29a, simplices 210, 212, 214 and 216 are assigned to leaf nodes 218, 220, 224 and 226, respectively, as shown in FIG. 29b. Just as in the quadtree, the ancestor nodes inherit the simplices of their leaf nodes. Thus, ancestor node 228 inherits the simplices of its children nodes 218 and 220; ancestor node 230 inherits the simplices of its children nodes 224 and 226; and ancestor node 232 inherits the simplices of its children nodes 228 and 230. Further, for each node the collection of simplices must be topologically a one-disk, that is, topologically a line segment. Since the nodes are all one-disks, each node has two end points. For example, node 218 has end points 234 and 236 and node 232 has end points 234 and 238. In direct analogy with surfaces and the quadtree, these endpoints are the critical vertices of the tree for the 1-cell. As with surfaces and the quadtree, to guarantee no cracking in a decimated view, it is necessary to visualize the critical vertices. For example, if the 1-cell illustrated in FIG. 29a is rendered at level-0 resolution, so that only the root node is rendered, then only the critical vertices associated with that node, 234 and 238, along with an edge connecting them, are rendered, as illustrated in FIGS. 29c and 29d. If the 1-cell illustrated in FIG. 29a is rendered at level-1 resolution, so that only nodes 228 and 230 are rendered, then the critical vertices associated with those nodes, 234, 238 and 240, along with the edges connecting them, are rendered, as illustrated in FIGS. 29c and 29d. Finally, if the 1-cell illustrated in FIG. 29a is rendered at level-2 resolution, so that nodes 218, 220, 224 and 226 are rendered, then the critical vertices associated with those nodes, 234, 236, 238, 240 and 242, along with 1-cells connecting them, are rendered, as illustrated in FIGS. 29c and 29d.

As in the quadtree, by using the critical vertices, each complete node front represents a uncracked decimation of the 1-cell. Each 1-cell has a pre-image in the parameter space of each 2-cell that this 1-cell bounds. The pre-image of the decimated 1-cell may have self-intersections and intersections with pre-images of other decimated 1-cells in this 2-cell's parameter space. Cho's algorithm, referred to above, is applied to the decimated 1-cells that bound a 2-cell to resolve the unwanted intersections. For each binary tree, the resulting decimation is represented by a complete node front of the tree.

Preventing intersection is time consuming. For a given model, several 1-cell decimations with different resolutions are precomputed. During the adaptive visualization, one of the decimations is selected. When the model is closer to the camera, a finer resolution of 1-cells is selected. When the model is further away, a coarser resolution is selected.

View Frustum Culling of 1-cells

View frustum culling of a surface is handled well by the quadtree, as described above. However, if a similar culling algorithm is applied to 1-cells, the result may change the macro-topology of the model. The system uses algorithms for view frustum culling of 1-cells that preserve the macro-topology within the view frustum.

The view frustum culling algorithm for the single-threaded implementation includes the following steps.

Figure 30A:
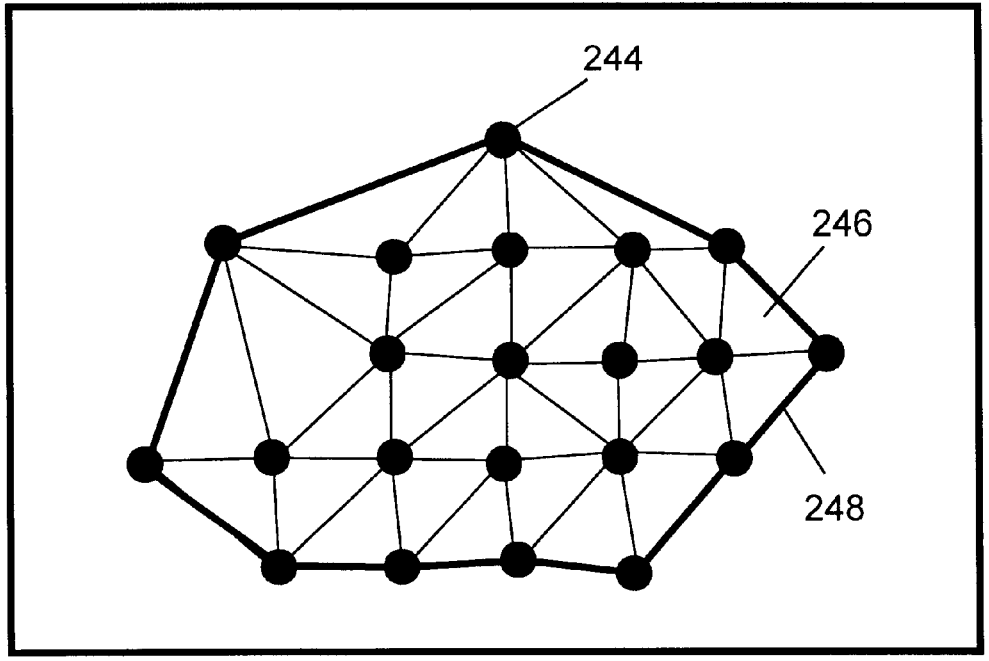
FIGS. 30a, 30b, 30c and 30d illustrate view frustum culling of a 1-cell.
Figure 30B:
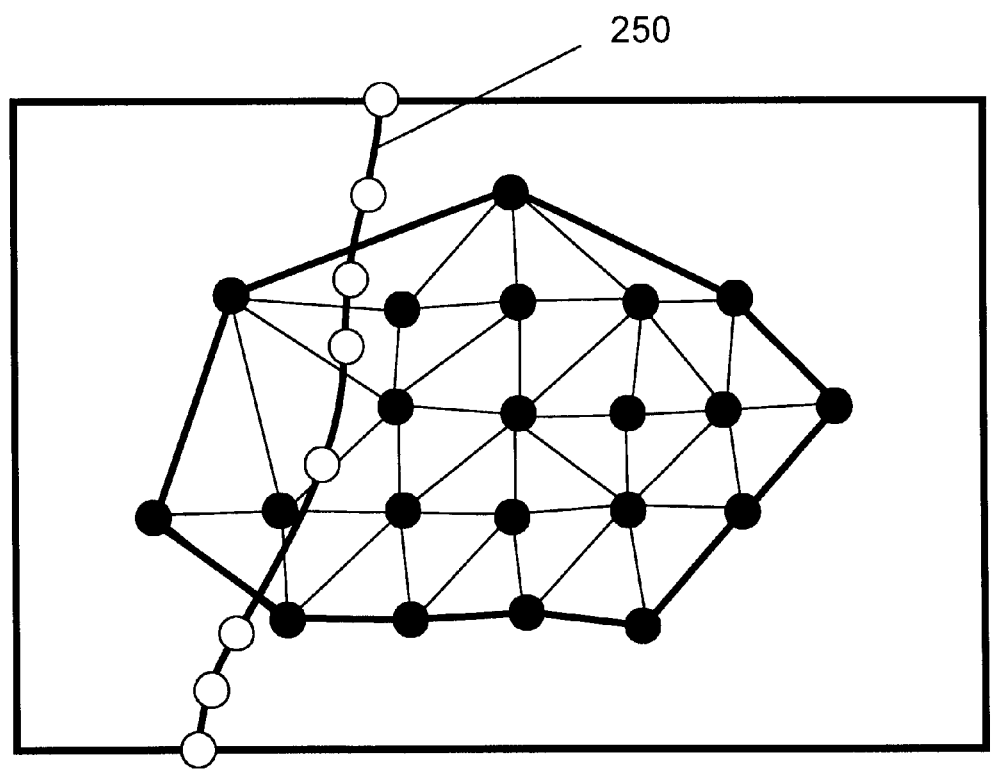
Figure 30C:
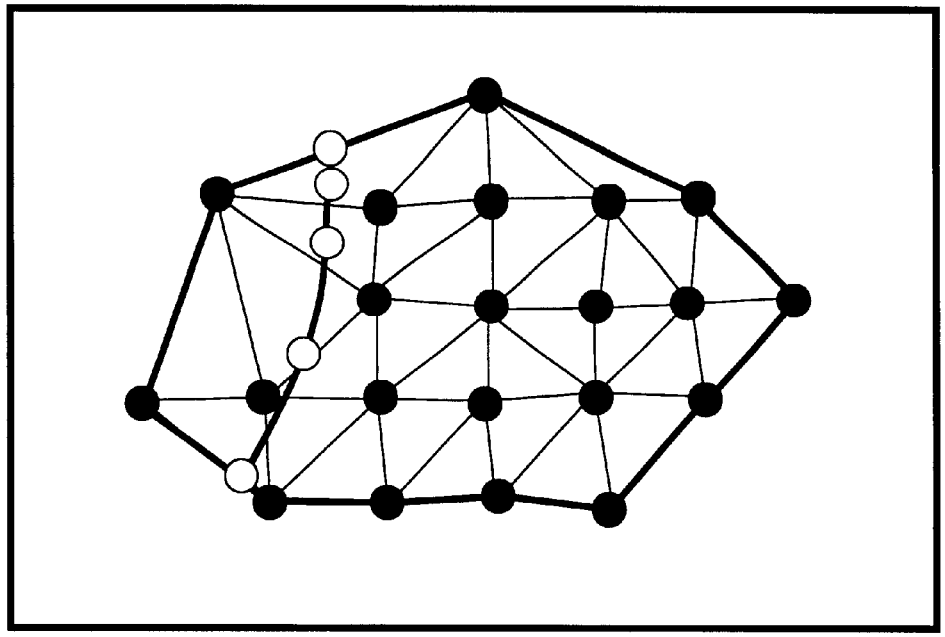
Figure 30D:
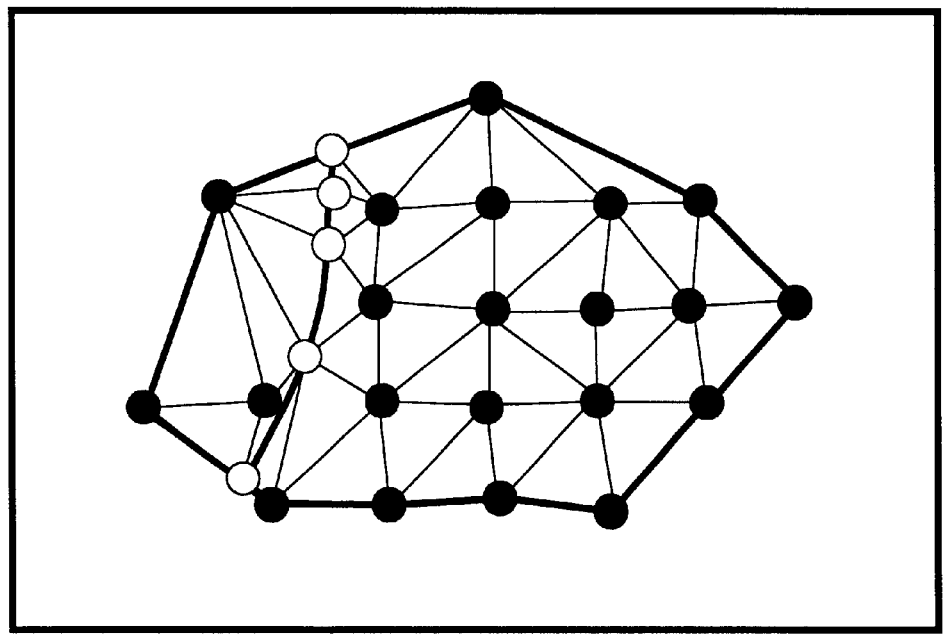

1. The 1-cells are represented by binary trees. A decimation of 1-cells is selected as described above.
2. For each 2D map, which might have several 2-cells,
    The quadtree is traversed, resulting in a set of vertices, e.g. 244 to be visualized, as shown in FIG. 30*a*. Unconstrained Delaunay tessellation is applied to the vertices in their parameter space to generate triangles, e.g. 246. These triangles are bounded by a convex hull 248.
    For each 1-cell that lies on this 2D map, such as 1-cell 250 in FIG. 30*b*, find the parameter values for the vertices for the selected decimation. Clip the 1-cell 30 against the convex hull in the parameter space, as shown in FIG. 30*c*. This can be done efficiently using the binary tree of the 1-cell. The vertices outside the convex hull are removed as shown in FIG. 30*c*. The intersection points of the 1-cell edge with the convex hull are added to the edge list, as shown in FIG. 3000*c*.
    The clipped 1-cells vertices and edges are added to the tessellation using incremental constrained Delaunay tessellation, as shown in FIG. 30*d*. Connected mesh components bounded by 1-cells or the convex hulls and their corresponding 2-cells are identified. Those mesh components that have no corresponding 2-cells are removed.

Figure 31A:
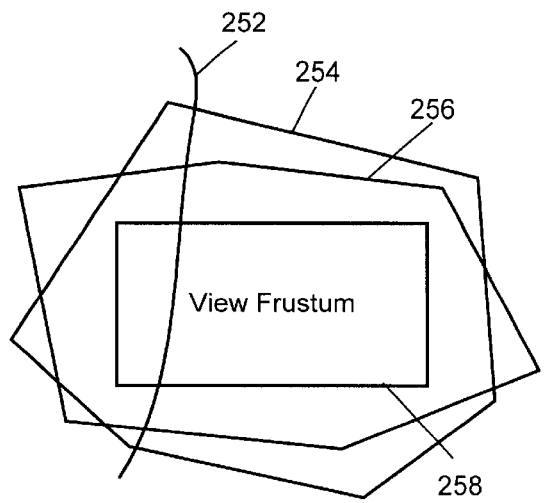
FIGS. 31a, 31b, 31c and 31d illustrate the effect of convex hulls on the view frustum culling of a 1-cell.
Figure 31B:
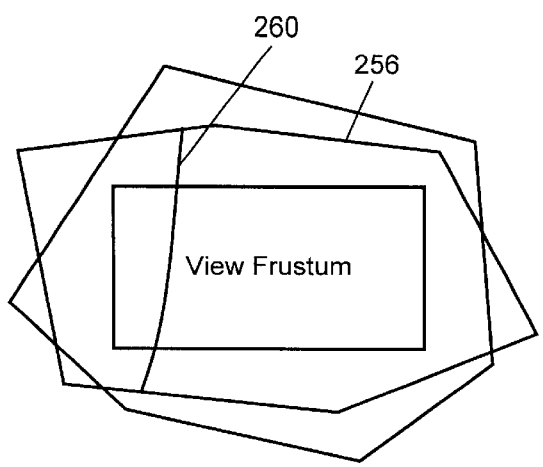
Figure 31C:
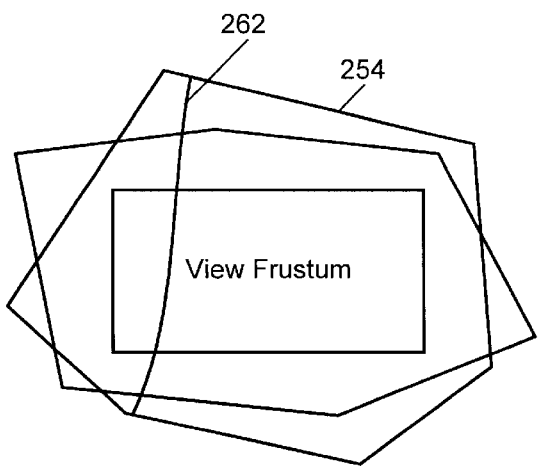
Figure 31D:
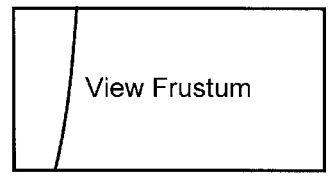

This algorithm applies to both coherent and non-coherent models. Note that 1-cells are shared by surfaces. A 1-cell might be on multiple 2D maps, which have different convex hulls resulting from the tessellation. Therefore, the clipping of the same 1-cell might be different from one 2D map to another. For example, in FIG. 31*a* 1-cell 252 may be clipped by one of two convex hulls 254 and 256 for presentation on view frustum 258. If the 1-cell 252 is clipped by convex hull 256, a fragment 260 results, as shown in FIG. 31*b*. If the 1-cell 252 is clipped by convex hull 254, a fragment 262 results, as shown in FIG. 31*c*. This presents no problem for visualization since the image of the convex hull in 3D space is outside the view frustum. Consequently, the image of the 1-cell 252 appears the same no matter which convex hull does the clipping, as shown in FIG. 31*d*.

For a multiply-threaded implementation, 1-cells cannot be culled since a part of the surface that is outside the view frustum in one frame might come into view in the next frame. In this case, when the model projection to the screen exceeds the view port, a coarser level of resolution of 1-cells is selected. Traversing the binary trees, portions of the 1-cells that are inside the view frustum are refined to a desired resolution that is determined from the pre-specified minimum pixel resolution. Note that the refinement might still cause new intersections. If this happens, a finer level of resolution of the 1-cells should be selected, and refinement inside view frustum may proceed if necessary.

Simplifications

When the requirement for the visual quality is less important, some simplifications may apply to achieve higher performance. Typically, the simplifications can be used when the camera is moving. When the interaction stops, the system draws a finer and more correct model that respects the macro topology.

Resolution Adjustment

To achieve a better performance during motion, we can render the geometry model at a coarser resolution by increasing the minimum projection area, that is, increasing $R_{min}$(screen) in Equation (7). When the motion stops, a finer resolution model is rendered by restoring $R_{min}$(screen).

Dynamic Level of Details

To reduce the traversal time, each surface in the model can be rendered with a selected level of quadtree nodes. Instead of specifying the minimum screen projection area for a quadtree node, a sequence of model-to-screen projection areas are specified, each corresponding to a surface quadtree level. For a smaller model-to-screen projection area, a coarser level of the quadtree is selected, and for a larger projection area, a finer level of the quadtree is selected. This is effectively a level of detail (LOD) technique, except that surface meshes are generated dynamically. This method applies when the model is contained entirely within the view frustum since, at that time, no view-frustum culling is needed.

Topological Simplification

The adaptive decimation of the model described earlier preserves intersection curves, that is, the topological boundaries between surfaces are preserved. To achieve a better performance during motion, the system relaxes the boundary preservation requirement.

If the application does not render different cells of the same surface feature differently, then during motion, SIGMA need not distinguish these cells at all, since one cannot move the model and at the same time interact with individual cells. On the other hand, for a non-coherent model, all 2-cells of a surface feature may still be on the same map, and hence share the same quadtree. In this case, we simply traverse the quadtrees, tessellate the vertices without edge constraints, and render the surfaces. One will see natural intersections resulting from surfaces occupying the same 3D space. These might not be the true intersection curves of the model; however, the visualization pipeline executes much faster, resulting smoother motion. When the motion stops, the system renders the model that preserve 1-cells and with distinguishable 2-cells.

Convex Hulls

Sometimes it is necessary to distinguish 2-cells even during motion, for example, to color 2-cells differently. In this case, the system uses the convex hull of the 2-cell in the parameter space to represent the cell. For a coherent model, the quadtree of the 2-cell is traversed resulting a set of vertices. The unconstrained Delaunay tessellator generates a triangle mesh bounded by the convex hull of the vertices in the parameter space. The parameter values of the triangles are evaluated and the resulting triangles are rendered.

For a 2-cell in a non-coherent model, the system uses the vertices of its 1-cells and some internal 2D vertices found from the 2-cell. Then, similar to the coherent model case, unconstrained Delaunay tessellation is applied.

Since, in general, a 2-cell is not convex, this simplification causes overlap between 2-cells. For geoscience models, such overlap is usually along the boundary. When the model is moving, such overlap may be tolerable.

Performance and Quality

Figure 32:
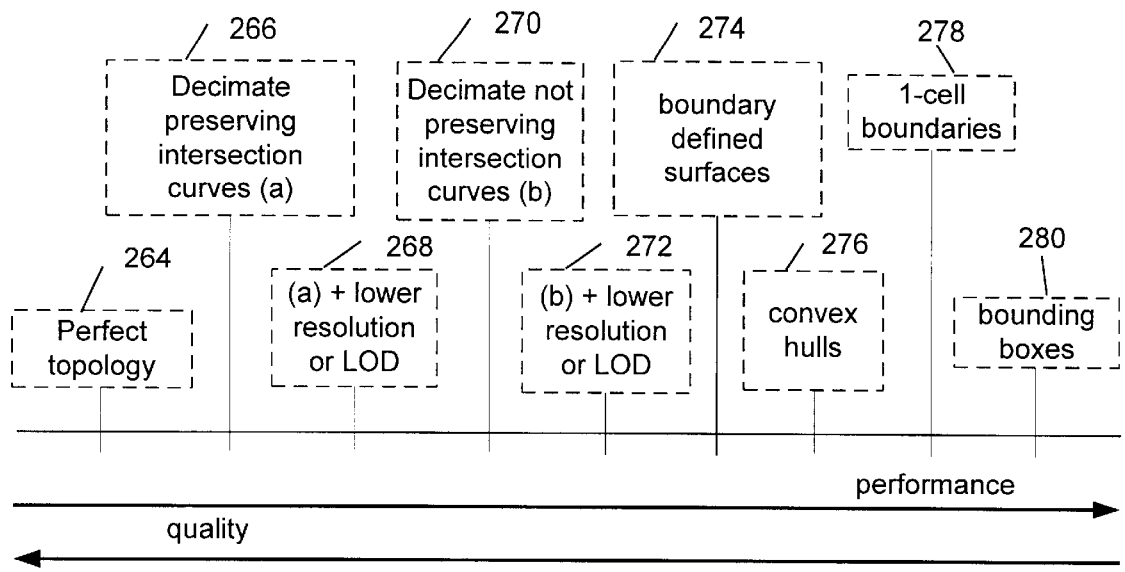
FIG. 32 illustrates the ability of a user to trade off quality and performance.

SIGMA enables a wide range of trade-offs in terms of model topology quality and performance. The topology quality directly relates to the visual quality of the rendered model, as shown in FIG. 32. At the far left on FIG. 32 is the perfect model topology 264, that is, the model is rendered as its original resolution. For a large model with many intersecting surfaces, the rendering performance could be very low. To achieve better performance, the model is decimated while preserving the intersection curves 266. There might be some topological changes as new intersections might occur between decimated surfaces. Higher performance may be achieved by decimating while preserving intersection curves and lowering the resolution 268. Moving toward higher performance, the intersection curves are not preserved 270. Again, higher performance may be achieved by lowering the resolution 272. As more topology and visual quality is sacrificed, by, for example, rendering only boundary defined surfaces 274, convex hulls 276, 1-cell boundaries 278 or bounding boxes 280, better performance is achieved. This range of trade-offs give users options according to their need and priorities. For example, one can choose lower quality when the camera is moving and higher quality when camera stops.

ADAPTIVE VISUALIZATION FOR INTERACTIVE GEOMETRY MODELING

The system applies adaptive visualization techniques to interactive geometry modeling.

IGM Extension

Figure 33:
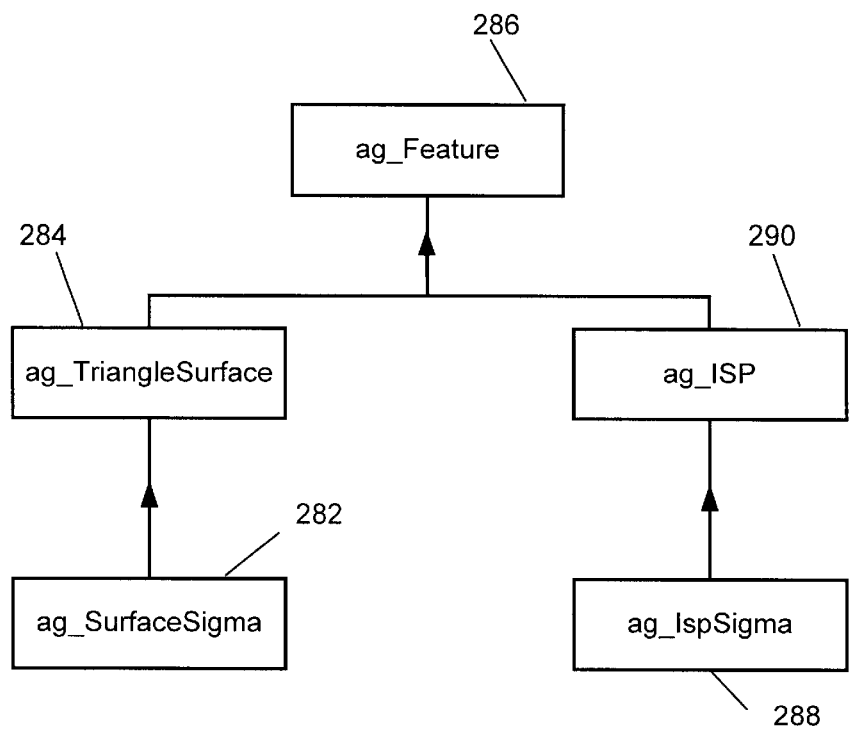
FIG. 33 illustrates the aggregate object hierarchy of a system according to the present invention.

SIGMA is integrated with IGM and GQI to support feature-based interactive geometry modeling. IGM is naturally extended to support SIGMA geometry and visualization objects to handle large models. With such extension, IGM mechanisms for consistency management, interactive modeling, partial update, material property management, structural editing, save, restore, and so on, apply to SIGMA objects automatically. FIG. 33 shows part of the aggregate objects hierarchy of IGM for SIGMA extension. An aggregate object ag_SurfaceSigma 282, is defined to represent a SIGMA surface. It is subclassed from ag_TriangleSurface 284, which is subclassed from ag_Feature 286. ag_SurfaceSigma 282 inherits the properties and the methods from ag_Feature 286 and ag_TriangleSurface 284 and in addition has the functionality of a SIGMA surface. An aggregate object ag_IspSigma 288 is defined to represent a SIGMA model. It is subclassed from ag_ISP, which is subclassed from ag_Feature 286. ag_ispSigma 288 inherits the properties and the methods from ag_Feature 286 and ag_ISP 290 and in addition has the functionality of a SIGMA model. With the flexibility of IGM architecture, the three hierarchies, aggregate, graphics, and geometry may extend differently. For example, on the geometry side, gm_ISP applies to SIGMA model directly.

IGM is extended to support the dynamic behavior required by adaptive visualization of SIGMA. The new IGM dynamic control enables IGM objects to track the camera motion, which triggers the adaptive visualization of the surfaces and the model. This dynamic control also enables the dynamic behavior of other IGM graphics objects, such as well trajectory, borehole images, and so on, which are not part of geometry model.

Adaptive Visualization in IGM

Figure 34:
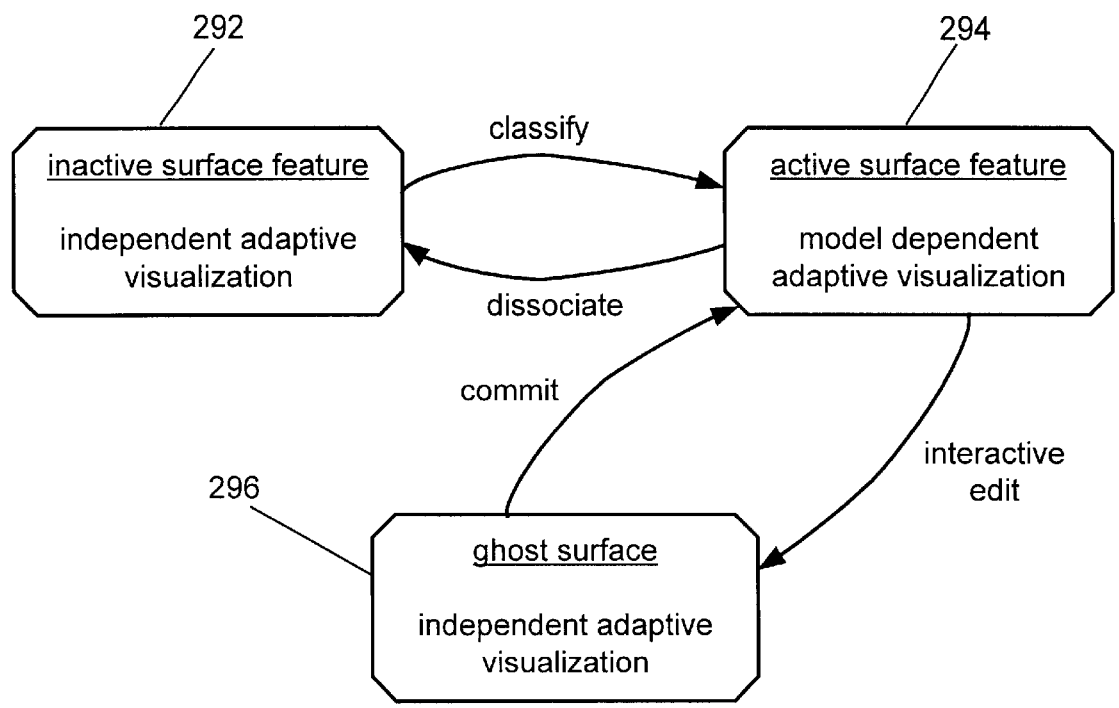
FIG. 34 illustrates a state machine according to the present invention.

The adaptive visualizations for surfaces and models are used for interactive geometry modeling at different stages. For a geometry model, IGM uses the algorithms described above. For a given surface, IGM manages the transition of the surface from its unclassified state to classified state, and manages the way the surface is visualized, as shown in FIG. 34. Before the surface is classified, it is an inactive surface feature 292 not part of the geometry model. The algorithm described above for adaptive visualization of surfaces applies to the surface in this state. Both the surface and the model are adaptively visualized, but are decimated independently. After the surface is classified into the model and becomes an active surface feature 294, the independent adaptive behavior is removed from the surface. During the adaptive visualization, the surface is decimated as part of the model to ensure no cracks in the model. If the surface feature is dissociated from the model it becomes an inactive surface feature.

To edit a classified surface, for example, to translate the surface, IGM graphically makes a ghost surface 296 from the surface to be edited. The user can then interactively manipulate the ghost surface 296 without changing the geometry model. During the user interaction, IGM applies adaptive visualization to the ghost surface 296 without worrying about the rest of the model. When the user finishes and commits the change, IGM edits the model by actually translating the surface (details are ignored here) and removes the ghost surface 296. The surface is again visualized as part of the model.

IGM allows users to visualize selected part of the model, for example, visualizing all active surface features, or all the volumes, or some surface features and some volumes. The algorithms presented above are applied to the selected part of the model. A surface cell may be shared by two volume cells, may belong to at least one surface feature, or may belong to more than one volume features. For visualization performance, surface cells should only be decimated once even when they have to be rendered multiple times, each for its belonging volume or features. To achieve this, IGM constructs the scene graph according to requirements, collects all the surface cells to be rendered, and sends them together to the visualization pipeline (FIG. 13). The pipeline ensures the surface cells are decimated all together to avoid cracks and once for each cell. IGM makes sure that the scene graph nodes get correct decimated cells.

Material Property Visualization

IGM can depict physical material properties defined within the geometry model. The mechanism is extended for adaptive visualization. Two types of material property visualization are supported: texture mapping and per-vertex rendering. Both cases utilize IGM and GQI mechanisms for attaching and evaluating material properties attached to surface features or volume features. IGM methods are then applied to map material property values to visual attribute, such as colors.

With texture mapping, the material property values on a surface are evaluated to generate the texture image. The underlying surface parameterization defines the texture coordinates. Only the texture coordinates of the vertices that participate the rendered meshes are sent to the graphics pipeline. With per-vertex rendering, material property values at the vertices that are rendered are evaluated, mapped to colors, and rendered. The values are evaluated as needed and may be cached for performance. A quadtree can be used to cache the colors of the vertices of a surface.

Models with Mixed Map Types

The underlying geometry engine SHAPES® allows the mixture of geometry object with some different map types.

Traditionally, the geometry model is built with objects with Web maps. The IGM extension handles geometry models with mixture of SIGMA surfaces and Web surfaces, and visualizes these surfaces accordingly. Such geometry models can still be adaptively decimated. However, when a 1-cell is a part of the boundary of a Web surface, this 1-cell cannot be decimated.

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described above and generate output information. The output information is applied to one or more output devices, in known fashion.

Each program is preferably implemented in a high level procedural or object oriented programming language (such as C++ or C) to communicate with a computer system. However, the programs can be implemented in assembly or machine language, if desired. In any case, the language may be a compiled or an interpreted language.

Each such computer program is preferably stored on a storage media or device (e.g., ROM or magnetic/optical disk or diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

The foregoing describes preferred embodiments of the invention and is given by way of example only. The invention is not limited to any of the specific features described herein, but includes all variations thereof within the scope of the appended claims.

What is claimed is:

1. A method for interactively building and visualizing a model comprising a first surface, the method being implemented in a programmed computer comprising a processor, a data storage system, at least one input device and at least one output device, the method and the model being stored on a computer-readable media, the method comprising representing a first surface at multiple levels of resolution wherein the representation allows the surface to be added to a model using irregular space partitioning;

representing each surface of the model at least one level of resolution wherein the surface representation allows ISP construction of the model;

using said surface representation of the first surface to:
   interactively build the model by adding the first surface to the model by using irregular space partitioning, thereby producing an ISP model;
   update the surface representation of at least one surface of the model after the irregular space partitioning;
   determine, as the ISP model is being built, the rendering resolution of a portion of the first surface based on a view frustum from which the first surface is to be viewed; and
   render the portion of the first surface on the output device, while the model is being built, using the rendering resolution.

2. The method of claim 1 wherein the first surface comprises one or more vertices and one or more edges and wherein determining comprises selecting, based on the view frustum, the vertices to be rendered from among the one or more vertices;

selecting, based on the view frustum, the edges to be rendered from among the one or more edges; and tessellating the vertices to be rendered and the edges to be rendered.

3. The method of claim 2 wherein the step of presenting a first surface further comprises partitioning the surface into $n_{i+1}$ nodes at resolution level-i using a level-i set of boundaries;

partitioning the surface into $n_{i+1}$ nodes at resolution level-i+1 using a level-i+1 set of boundaries, resolution level-i+1 having greater resolution than resolution level-i;

associating each level-i+1 node with a unique level-i node;

associating with each level-i node the level-i+1 nodes associated to the node; and each node having associated with it a bounding object, each bounding object spatially bounding its associated node.

4. The method of claim 3 wherein selecting the vertices to be rendered comprises selecting a node front from among the nodes and collecting the vertices from the node front.

5. The method of claim 4 wherein selecting the node front comprises culling the nodes that are outside a view frustum, the view frustum being determined by the view frustum from which the surface is to be viewed.

6. The method of claim 4 wherein selecting the node front comprises selecting nodes from among those nodes having bounding objects that intersect the view frustum.

7. The method of claim 4 wherein selecting comprises projecting a level-i node to a screen;

the projection of the level-i node to the screen having an area;

adding the level-i node to the node front if the area of the projection is smaller than a predefined minimum resolution;

adding the level-i node to the node front if there are no level-i+1 nodes associated with the level-i node; and considering the level-i+1 nodes associated with the level-i node for inclusion in the node front if the area of the projection of the level-i node is larger than a predefined minimum resolution.

8. The method of claim 7 wherein the bounding object of a level-i node is a sphere;

the level-i node is added to the node front if the following equation is satisfied:

$$R(\text{sphere}) \leq K \times D$$

wherein
   K is a constant computed for the view frustum; and
   D is the distance from the center of the level-i node's bounding object to a view point associated with the view frustum.

9. The method of claim 8 wherein the projection is onto a projection plane, the projection plane having a minimum side length, and the projection being viewed from the view point through a viewport, the viewport having a side length corresponding to the minimum side length of the projection region, wherein $$K = \frac{L \times R_{\min}(\text{screen})}{d}$$

wherein
L is the ratio of the minimum side length of the projection region on the projection plane to the corresponding side length of the viewport;
$R_{min}$(screen) is the predetermined radius of minimum projection area on the screen; and
d is the distance from the view point to the projection plane.

10. The method of claim 7 wherein the level-i node comprises one or more simplices, each simplex comprising a surface normal, wherein
the bounding object of a level-i node is a sphere;
the level-i node is added to the node front if the following equation is satisfied:

$$R(\text{sphere}) \leq f(\theta, \Delta\theta) \times K \times D$$

where
$f(\theta, \Delta\theta)$ is a scaling function of the average normal $\theta$ and the deviation $\Delta\theta$ of the surface normals of the level-i node's simplices;
K is a constant computed for the view frustum; and
D is the distance from the center of the level-i node's bounding object to a viewpoint associated with the view frustum.

11. The method of claim 10 wherein $f(\theta, \Delta\theta)$ is precomputed and stored in a lookup table.

12. The method of claim 2 further comprising
removing no-longer-to-be-rendered vertices from the list of vertices to be rendered and adding vertices to the list of vertices to be rendered when the view frustum is changed;
removing the tessellation from a no-longer-to-be-rendered portion of the surface including the no-longer-to-be-rendered vertices using decremental tessellation; and
tessellating an added portion of the first surface including the added vertices using incremental tessellation.

13. The method of claim 2 wherein the first surface comprises one or more cells and a 2D map, the 2D map comprising all of the vertices in the surface, the 2D map having a domain and a range, and wherein tessellating comprises
tessellating a subset of the vertices in the domain of the 2D map; and
creating a triangle mesh using the range values of the subset of vertices and the tessellation of the domain.

14. The method of claim 13 wherein the tessellation of the subset of vertices in the domain of the 2D map includes a chosen collection of edges.

15. The method of claim 2 wherein the first surface comprises one or more 2-cells, one or more 1-cells that form the boundaries of the 2-cells, and one or more 0-cells that form the boundaries of the 1-cells, and wherein rendering comprises
decimating the 1-cells;
identifying the decimated 1-cells that form the boundary of a 2-cell;
detecting an intersection between the 1-cells that form the boundary of the 2-cell; and
removing the intersection.

16. The method of claim 15 wherein each 1-cell comprises one or more simplices, and decimating a 1-cell comprises
building a tree for the 1-cell by assigning each simplex of the 1-cell to a unique leaf node of the tree; and associating n connected level-i+1 nodes with a level-i node;
defining as critical vertices at resolution level-i the boundary vertices of the level-i nodes;
selecting a node front of the tree;
collecting the vertices from the node front;
adding the 0-cells to the collection of vertices; and
building a collection of edges from the vertices in a domain of a 2D map.

17. The method of claim 1, wherein the view frustum is related to a camera position, the camera position having a history, the camera having an actual future time position at a future time, the method further comprising
predicting, prior to the future time, the camera position at the future time based on the camera position history;
computing, prior to the future time, the future time portion of the first surface to be rendered at the future time;
determining, prior to the future time, the future time rendering resolution of the future time portion based on a view frustum from which the first surface is to be viewed at the future time; and
rendering on the output device, when the future time arrives, the future time portion of the first surface using the future time rendering resolution if the predicted future time camera position substantially matches the actual future time camera position.

18. The method of claim 17, wherein predicting is accomplished with a Kalman filter.

19. The method of claim 1, wherein the method has one or more performance criteria and one or more quality criteria, the method further comprising
allowing a user to adjust one or more parameters, wherein adjusting at least one of the one or more parameters results in a tradeoff between at least one performance criterion and at least one quality criterion.

20. The method of claim 1, further comprising
rendering on the output device, using the rendering resolution, a representation of a material property associated with the rendered portion of the first surface.

21. The method of claim 1 wherein each surface has a state associated with it, further comprising:
assigning a first state to a surface to be added to the model;
independently adaptively visualizing a surface in the first state using said representation of the surface;
wherein the step of building the model, comprises classifying a surface in the first state into the model and when classifying a surface into the model, assigning a second state to a surface classified into the model; and
visualizing a surface in the second state using said representation of the surface dependent on the model.

22. The method of claim 21, further comprising:
interactively editing a surface of the model;
assigning a third state to the edited surface;
independently adaptively visualizing any surface having assigned to it the third state.

23. A method for interactively building and simultaneously visualizing a model comprising one or more surfaces, the method being implemented in a programmed computer comprising a processor, a data storage system, at least one input device and at least one output device, the method and the model being stored on a computer-readable media, the method comprising
- building a representation of one of the one or more surfaces wherein the representation is multi-resolution and allows ISP construction of the model;
- building the model using irregular space partitioning;
- generating a graphics model based on the multi-resolution surface representation;
- rendering the graphics model, while the model is being built; and
- displaying the graphics model on an output device.

24. A method for interactively building and visualizing geological data representing a geoscience model of the characteristics of a geological region, the geoscience model comprising one or more geometry objects, the method being implemented in a programmed computer comprising a processor, a data storage system, at least one input device and at least one output device, the method and the data being stored on a computer-readable media, the method comprising
- representing a first surface at multiple levels of resolution wherein the representation allows ISP construction of the model;
- representing each surface of the model at at least one level of resolution
- wherein the representations allow ISP construction of the model;
- using said surface representation of the first surface to:
  - interactively build the model, using irregular space partitioning to add the first surface into the model;
  - adaptively visualize the geological data in the geoscience model by visualizing the first surface and the model independently of one another prior to adding the surface into the model and visualizing the model, including the surface, after adding the surface into the model; and
- displaying the model on an output device.

25. A computer system for visualizing and interactively building a model comprising a first surface, the computer system comprising
- a programmed computer comprising a processor, a data storage system, at least one input device and at least one output device, the computer system comprising
- means for representing each surface of the model at at least one level of resolution wherein the surface representation allows ISP construction of the model;
- means for representing a first surface at multiple levels of resolution wherein the representation allows the surface to be added to a model using irregular space partitioning;
- means for using said surface representation of the first surface to:
  - use irregular space partitioning to build the model;
- means using said surface representation for determining, as the model is being built, the rendering resolution of a portion of the first surface based on a view frustum from which the first surface is to be viewed; and
- means using said surface representation for rendering, as the model is being built, the portion of the first surface on the output device using the rendering resolution.

26. The computer system of claim 25 wherein the first surface comprises one or more vertices and one or more edges and wherein the means for determining comprises
- means for selecting, based on the view frustum, the vertices to be rendered from among the one or more vertices;
- means for selecting, based on the view frustum, the edges to be rendered from among the one or more edges; and
- means for tessellating the vertices to be rendered and the edges to be rendered.

27. The computer system of claim 26 further comprising
- means for partitioning the surface into $n_i$ nodes at resolution level-i using a level-i set of boundaries;
- means for partitioning the surface into $n_{i+1}$ nodes at resolution level-i+1 using a level-i+1 set of boundaries, resolution level-i+1 having greater resolution than resolution level-i;
- means for associating each level-i+1 node with a unique level-i node;
- means for associating with each level-i node the level-i+1 nodes associated to the node; and
- each node having associated with it a bounding object, each bounding object spatially bounding its associated node.

28. The computer system of claim 27 wherein the means for selecting the vertices to be rendered comprises
- means for selecting a node front from among the nodes and collecting the vertices from the node front.

29. The computer system of claim 28 wherein the means for selecting the node front comprises
- means for culling the nodes that are outside a view frustum, the view frustum being determined by the view frustum from which the surface is to be viewed.

30. The computer system of claim 28 wherein the means for selecting the node front comprises
- means for selecting nodes from among those nodes having bounding objects that intersect the view frustum.

31. The computer system of claim 28 wherein the means for selecting comprises
- means for projecting a level-i node to a screen;
- the projection of the level-i node to the screen having an area;
- means for adding the level-i node to the node front if the area of the projection is smaller than a predefined minimum resolution;
- means for adding the level-i node to the node front if there are no level-i+1 nodes associated with the level-i node; and
- means for considering the level-i+1 nodes associated with the level-i node for inclusion in the node front if the area of the projection of the level-i node is larger than a predefined minimum resolution.

32. The computer system of claim 31 wherein
the bounding object of a level-i node is a sphere;
the level-i node is added to the node front if the following equation is satisfied:

$$R(\text{sphere}) \leq K \times D$$

wherein
K is a constant computed for the view frustum; and
D is the distance from the center of the level-i node's bounding object to a view point associated with the view frustum.

33. The computer system of claim 26 further comprising
  means for removing no-longer-to-be-rendered vertices from the list of vertices to be rendered and adding vertices to the list of vertices to be rendered when the view frustum is changed;
  means for removing the tessellation from a no-longer-to-be-rendered portion of the surface including the no-longer-to-be-rendered vertices using decremental tessellation; and
  means for tessellating an added portion of the surface including the added vertices using incremental tessellation.

34. The computer system of claim 26 wherein the surface comprises one or more cells and a 2D map, the 2D map comprising all of the vertices in the surface, the 2D map having a domain and a range, and wherein the means for tessellating comprises
  means for tessellating a subset of the vertices in the domain of the 2D map; and
  means for creating a triangle mesh using the range values of the subset of vertices and the tessellation of the domain.

35. The computer system of claim 26 wherein the surface comprises one or more 2-cells, one or more 1-cells that form the boundaries of the 2-cells, and one or more 0-cells that form the boundaries of the 1-cells, and wherein the means for rendering comprises
  means for decimating the 1-cells;
  means for identifying the decimated 1-cells that form the boundary of a 2-cell;
  means for detecting an intersection between the 1-cells that form the boundary of the 2-cell; and
  means for removing the intersection.

36. The computer system of claim 25, wherein the view frustum is related to a camera position, the camera position having a history, the camera having an actual future time position at a future time, the computer system further comprising
  means for predicting, prior to the future time, the camera position at the future time based on the camera position history;
  means for computing, prior to the future time, the future time portion of the first surface to be rendered at the future time;
  means for determining, prior to the future time, the future time rendering resolution of the future time portion based on a view frustum from which the first surface is to be viewed at the future time; and
  rendering on the output device, when the future time arrives, the future time portion of the first surface using the future time rendering resolution if the predicted future time camera position substantially matches the actual future time camera position.

37. The computer system of claim 25, wherein the computer system has one or more performance criteria and one or more quality criteria, the computer system further comprising
  means for allowing a user to adjust one or more parameters, wherein adjusting at least one of the one or more parameters results in a tradeoff between at least one performance criterion and at least one quality criterion.

38. The computer system of claim 25, further comprising
  means for rendering on the output device, using the rendering resolution, a representation of a material property associated with the rendered portion of the first surface.

39. A computer system for interactively building and visualizing a model comprising one or more surfaces, the computer system comprising a programmed computer comprising a processor, a data storage system, at least one input device and at least one output device, the computer system comprising
  means for building a multi-resolution representation of one of the one or more surfaces wherein the surface representation allows ISP construction of the model;
  means for interactively building the model by using irregular space partitioning to generate an ISP graphics model based on the multi-resolution surface representation;
  means for updating the surface representation of at least one surface of the model after the irregular space partitioning; and
  means for rendering the graphics model of the surface representation while the ISP model is being generated.

40. An article of manufacture comprising
  a computer usable medium having computer readable code means embodied therein for causing visualization of a model comprising a first surface, the computer readable program code means in said article of manufacture comprising:
    computer readable program code means for representing the first surface at multiple levels of resolution wherein surface representation allows the surface to be added to the model by using ISP construction;
    computer readable program code means for representing each surface of the model at at least one level of resolution wherein the representation allows ISP construction of the model;
    computer readable program code means for using irregular space partitioning to interactively build the model using said surface representation of the first surface, wherein the model is an ISP model;
    computer readable program code means for updating the surface representation of at least one surface of the ISP model after the irregular space partitioning of the ISP model;
    computer readable program code means for causing a computer to determine using said surface representation of the first surface, as the ISP model is being built, the rendering resolution of a portion of the first surface based on a view frustum from which the first surface is to be viewed; and
    computer readable program code means for causing a computer to render the portion of the first surface, using said surface representation of the first surface, on the output device using the rendering resolution as the ISP model is being built.

41. The article of manufacture of claim 40 wherein the first surface comprises one or more vertices and one or more edges and wherein the computer readable program code means for causing a computer to determine comprises
  computer readable program code means for causing a computer to select, based on the view frustum, the vertices to be rendered from among the one or more vertices;
  computer readable program code means for causing a computer to selecting, based on the view frustum, the edges to be rendered from among the one or more edges; and
  computer readable program code means for causing a computer to tessellate the vertices to be rendered and the edges to be rendered.

42. The article of manufacture of claim 41 wherein the computer program code for representing a first surface further comprises computer readable program code means for causing a computer to partition the surface into $n_i$ nodes at resolution level-i using a level-i set of boundaries;

computer readable program code means for causing a computer to partition the surface into $n_{i+1}$ nodes at resolution level-i+1 using a level-i+1 set of boundaries, resolution level-i+1 having greater resolution than resolution level-i;

computer readable program code means for causing a computer to associate each level-i+1 node with a unique level-i node;

computer readable program code means for causing a computer to associate with each level-i node the level-i+1 nodes associated to the node; and each node having associated with it a bounding object, each bounding object spatially bounding its associated node.

43. The article of manufacture of claim 42 wherein the computer readable program code means for causing a computer to select the vertices to be rendered comprises computer readable program code means for causing a computer to selecting a node front from among the nodes and collecting the vertices from the node front.

44. The article of manufacture of claim 43 wherein the computer readable program code means for causing a computer to select the node front comprises computer readable program code means for causing a computer to cull the nodes that are outside a view frustum, the view frustum being determined by the view frustum from which the surface is to be viewed.

45. The article of manufacture of claim 43 wherein the computer readable program code means for causing a computer to select the node front comprises computer readable program code means for causing a computer to select nodes from among those nodes having bounding objects that intersect the view frustum.

46. The article of manufacture of claim 43 wherein the computer readable program code means for causing a computer to select comprises computer readable program code means for causing a computer to projecting a level-i node to a screen;

the projection of the level-i node to the screen having an area;

computer readable program code means for causing a computer to add the level-i node to the node front if the area of the projection is smaller than a predefined minimum resolution;

computer readable program code means for causing a computer to add the level-i node to the node front if there are no level-i+1 nodes associated with the level-i node; and computer readable program code means for causing a computer to consider the level-i+1 nodes associated with the level-i node for inclusion in the node front if the area of the projection of the level-i node is larger than a predefined minimum resolution.

47. The article of manufacture of claim 46 wherein the bounding object of a level-i node is a sphere;

the level-i node is added to the node front if the following equation is satisfied:

$$R(\text{sphere}) \leq K \times D$$

wherein

K is a constant computed for the view frustum; and

D is the distance from the center of the level-i node's bounding object to a view point associated with the view frustum.

48. The article of manufacture of claim 41 further comprising computer readable program code means for causing a computer to remove no-longer-to-be-rendered vertices from the list of vertices to be rendered and add vertices to the list of vertices to be rendered when the view frustum is changed;

computer readable program code means for causing a computer to remove the tessellation from a no-longer-to-be-rendered portion of the surface including the no-longer-to-be-rendered vertices using decremental tessellation; and computer readable program code means for causing a computer to tessellate an added portion of the first surface including the added vertices using incremental tessellation.

49. The article of manufacture of claim 41 wherein the first surface comprises one or more cells and a 2D map, the 2D map comprising all of the vertices in the surface, the 2D map having a domain and a range, and wherein the computer readable program code means for causing a computer to tessellate comprises computer readable program code means for causing a computer to tessellate a subset of the vertices in the domain of the 2D map; and computer readable program code means for causing a computer to create a triangle mesh using the range values of the subset of vertices and the tessellation of the domain.

50. The article of manufacture of claim 49 wherein the tessellation of the subset of vertices in the domain of the 2D map includes a chosen collection of edges.

51. The article of manufacture of claim 41 wherein the first surface comprises one or more 2-cells, one or more 1-cells that form the boundaries of the 2-cells, and one or more 0-cells that form the boundaries of the 1-cells, and wherein the computer readable program code means for causing a computer to render comprises computer readable program code means for causing a computer to decimate the 1-cells;

computer readable program code means for causing a computer to identify the decimated 1-cells that form the boundary of a 2-cell;

computer readable program code means for causing a computer to detect an intersection between the 1-cells that form the boundary of the 2-cell; and computer readable program code means for causing a computer to remove the intersection.

52. The article of manufacture of claim 40, wherein the view frustum is related to a camera position, the camera position having a history, the camera having an actual future time position at a future time, the article of manufacture further comprising computer readable program code means for causing a computer to predict, prior to the future time, the camera position at the future time based on the camera position history;

computer readable program code means for causing a computer to compute, prior to the future time, the future time portion of the first surface to be rendered at the future time;

computer readable program code means for causing a computer to determine, prior to the future time, the future time rendering resolution of the future time portion based on a view frustum from which the first surface is to be viewed at the future time; and rendering on the output device, when the future time arrives, the future time portion of the first surface using the future time rendering resolution if the predicted future time camera position substantially matches the actual future time camera position.

53. The article of manufacture of claim 40, wherein the article of manufacture has one or more performance criteria and one or more quality criteria, the article of manufacture further comprising computer readable program code means for causing a computer to allow a user to adjust one or more parameters, wherein adjusting at least one of the one or more parameters results in a tradeoff between at least one performance criterion and at least one quality criterion.

54. The article of manufacture of claim 40, further comprising computer readable program code means for causing a computer to render on the output device, using the rendering resolution, a representation of a material property associated with the rendered portion of the first surface.

55. An article of manufacture comprising computer readable program code means for representing the first surface at multiple levels of resolution wherein the surface representation allows the surface to be added to a model using irregular space partitioning;

computer readable program code means for representing each surface of the model at at least one level of resolution wherein the representation allows surfaces to be added to the model using irregular space partitioning;

computer readable program code means for using irregular space partitioning to build the model;

computer readable program code means for updating the surface representation of at least one surface of the model after the irregular space partitioning;

a computer usable medium having computer readable code means embodied therein for causing visualization of geological data representing a geoscience model of the characteristics of a geological region, the geoscience model comprising one or more geometry objects, the computer readable program code means in said article of manufacture comprising:

computer readable program code means for causing a computer to adaptively visualize the geological data in the geoscience model by visualizing the first surface and the model prior to classifying the surface into the model and visualizing the model after classifying the surface into the model; and displaying the surface on an output device.

* * * * *